(12) United States Patent
Komatsu et al.

(10) Patent No.: US 7,747,807 B2
(45) Date of Patent: Jun. 29, 2010

(54) HOST CONTROLLER INCLUDING A DISCONNECTION DETECTION CIRCUIT

(75) Inventors: Fumikazu Komatsu, Okaya (JP); Shoichiro Kasahara, Minowa machi (JP); Mitsuaki Sawada, Suwa (JP)

(73) Assignee: Seiko Epson Corporation (JP)

( * ) Notice: Subject to any disclaimer, the term of this patent is extended or adjusted under 35 U.S.C. 154(b) by 226 days.

(21) Appl. No.: 11/500,250

(22) Filed: Aug. 7, 2006

(65) Prior Publication Data

US 2007/0030035 A1 Feb. 8, 2007

(30) Foreign Application Priority Data

| Aug. 8, 2005 | (JP) | ............................. 2005-229353 |
| Jul. 7, 2006 | (JP) | ............................. 2006-187950 |

(51) Int. Cl.
*H05K 7/10* (2006.01)
(52) U.S. Cl. .................... 710/301; 710/15; 710/302; 710/305
(58) Field of Classification Search ......... 710/301–302, 710/305, 15
See application file for complete search history.

(56) References Cited

U.S. PATENT DOCUMENTS

| 4,375,636 | A | * | 3/1983 | Stack et al. ................... 341/116 |
| 5,586,271 | A | * | 12/1996 | Parrett ......................... 710/302 |
| 5,689,655 | A | * | 11/1997 | Tanaka et al. ................ 710/302 |
| 5,758,102 | A | * | 5/1998 | Carey et al. .................. 710/302 |
| 5,862,350 | A | * | 1/1999 | Coulson ...................... 710/302 |
| 5,919,253 | A | * | 7/1999 | Schneider .................... 710/302 |
| 5,963,053 | A | * | 10/1999 | Manohar et al. .............. 326/60 |
| 6,065,069 | A | * | 5/2000 | Klein ............................ 710/15 |
| 6,279,060 | B1 | * | 8/2001 | Luke et al. .................... 710/64 |
| 6,415,342 | B1 | * | 7/2002 | Wahl et al. .................. 710/100 |
| 6,593,768 | B1 | * | 7/2003 | Iyer et al. ...................... 326/30 |
| 6,631,159 | B1 | * | 10/2003 | Morris ......................... 375/219 |
| 6,647,452 | B1 | * | 11/2003 | Sonoda ......................... 710/305 |
| 6,791,950 | B2 | * | 9/2004 | Wu ............................... 370/257 |
| 7,032,051 | B2 | * | 4/2006 | Reay et al. .................... 710/301 |
| 7,085,876 | B2 | * | 8/2006 | Lai et al. ...................... 710/313 |
| 7,464,206 | B2 | * | 12/2008 | Tsunekawa ................. 710/105 |
| 2002/0109532 | A1 | | 8/2002 | Nakada |
| 2002/0167342 | A1 | | 11/2002 | Nakada |
| 2003/0115400 | A1 | * | 6/2003 | Hoshino et al. ............. 710/305 |

(Continued)

FOREIGN PATENT DOCUMENTS

JP 2002-232273 8/2002

(Continued)

*Primary Examiner*—Mark Rinehart
*Assistant Examiner*—Nimesh G Patel
(74) *Attorney, Agent, or Firm*—Harness, Dickey & Pierce, P.L.C.

(57) ABSTRACT

A host controller includes a disconnection detection circuit 52 which compares a voltage level of a first differential signal DP of first and second differential signals DP and DM making up a differential signal pair corresponding to a given range in a frame packet with a comparison voltage CV, compares a voltage level of the second differential signal DM corresponding to a given range in the frame packet with the comparison voltage CV, and detects that a host and a device have been disconnected when the voltage level of at least one of the first and second differential signals DP and DM corresponding to the given range is higher than the comparison voltage CV.

14 Claims, 15 Drawing Sheets

U.S. PATENT DOCUMENTS

| | | | |
|---|---|---|---|
| 2006/0015670 A1* | 1/2006 | Cinkler et al. | 710/302 |
| 2006/0117195 A1* | 6/2006 | Niwa et al. | 713/300 |
| 2006/0218330 A1* | 9/2006 | Tsunekawa | 710/302 |
| 2007/0106825 A1* | 5/2007 | Duval et al. | 710/106 |

FOREIGN PATENT DOCUMENTS

| | | |
|---|---|---|
| JP | 2002-344540 | 11/2002 |

* cited by examiner

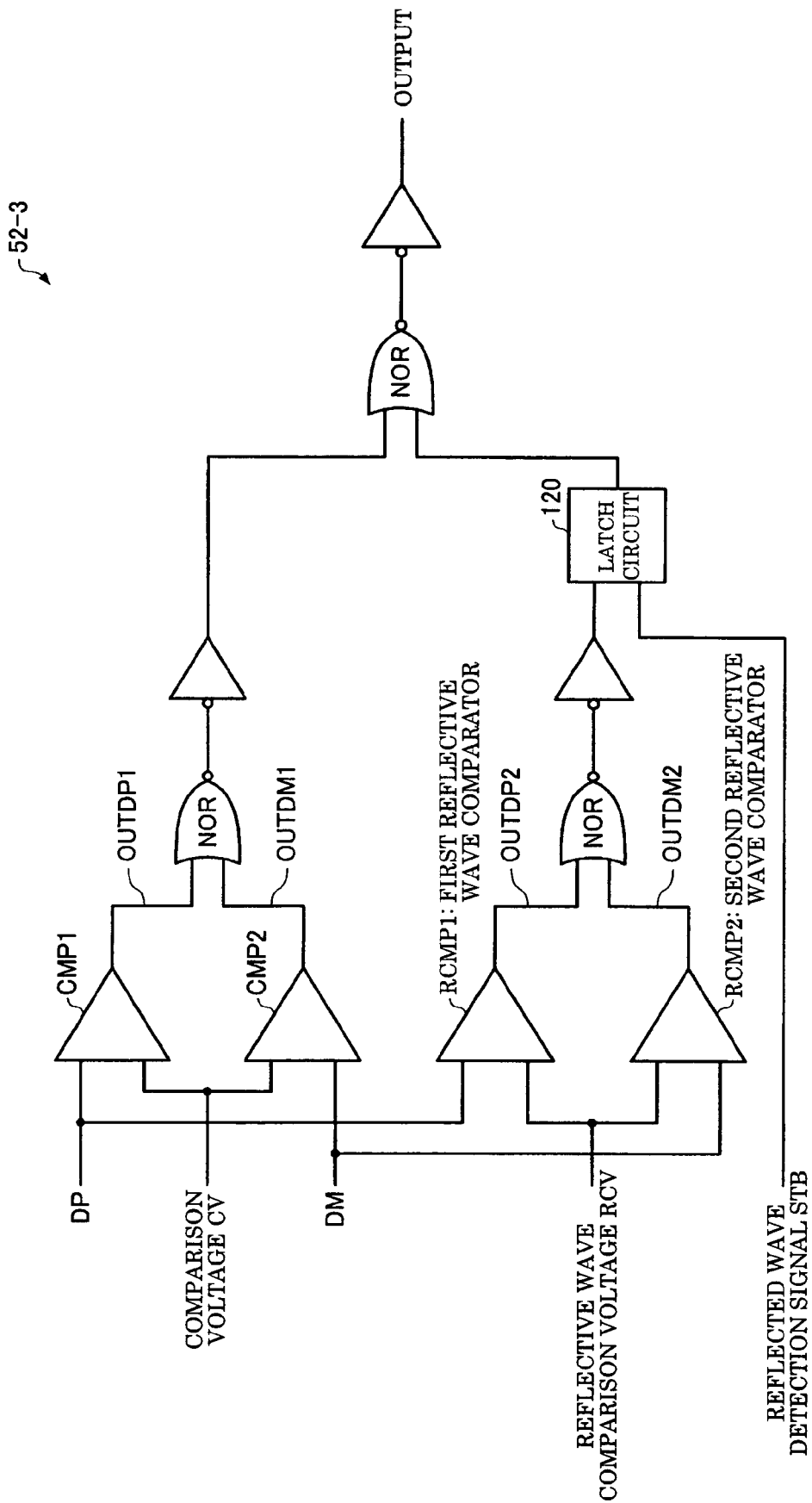

HOST CONTROLLER INCLUDING A DISCONNECTION DETECTION CIRCUIT

Japanese Patent Application No. 2005-229353 filed on Aug. 8, 2005 and Japanese Patent Application No. 2006-187950 filed on Jul. 7, 2006, are hereby incorporated by reference in their entirety.

BACKGROUND OF THE INVENTION

The present invention relates to a host controller.

In recent years, the Universal Serial Bus (USB) standard has attracted attention as an interface standard for connecting a personal computer with a peripheral device (electronic instrument in a broad sense). The USB standard has advantages in that peripheral devices such as a mouse, keyboard, and printer, which have been connected using connectors of different standards, can be connected using connectors of the same standard, and so-called plug & play and hot plug can be realized.

On the other hand, the USB standard has a problem in which the transfer rate is lower than that of the IEEE 1394 standard which has also attracted attention as the serial bus interface standard.

The USB 2.0 standard has been developed and has attracted attention. This standard realizes a data transfer rate of 480 Mbps (High Speed (HS) mode) remarkably higher than that of the USB 1.1 standard while maintaining compatibility with the USB 1.1 standard. The USB 2.0 Transceiver Macrocell Interface (UTMI) standard has also been developed. This standard defines the interface specification of the physical layer circuit and the logical layer circuit of the USB 2.0 standard.

In the USB 2.0 standard, a transfer mode called the HS mode is provided in addition to the Full Speed (FS) mode which has been defined by the USB 1.1 standard. In the HS mode, since data is transferred at a transfer rate of 480 Mbps, data transfer remarkably higher than that of the FS mode (12 Mbps) can be realized. Therefore, the USB 2.0 standard can provide an interface suitable for storage devices such as hard disk drives and optical disk drives for which a high transfer rate is demanded.

In the USB 2.0 standard, small-amplitude signals are transferred at a high speed in comparison with the USB 1.1 standard. Such high-frequency small-amplitude signals are affected to a large extent by the quality of the transmission line and the termination resistor of the device. Therefore, a USB 2.0 host controller must be provided with a disconnection detection circuit which can accurately detect that the host and the device have been disconnected for such small-amplitude signals which tend to be affected.

JP-A-2002-232273 discloses a window voltage comparator for determining whether the difference between the voltages of the differential signal lines is greater or smaller than a set value. JP-A-2002-344540 discloses providing a squelch circuit which detects the presence or absence of a pair of differential reception signals and detecting disconnection using the voltage level of one of the differential signals.

SUMMARY

One aspect of the invention relates to a host controller which transfers data through a bus using a differential signal pair and transmits to a device a frame packet defined by a given standard at given intervals defined by the given standard, the host controller comprising:

a disconnection detection circuit which compares a voltage level of a first differential signal of first and second differential signals making up the differential signal pair corresponding to a given range in the frame packet with a comparison voltage, compares a voltage level of the second differential signal corresponding to the given range in the frame packet with the comparison voltage, and detects that a host and a device have been disconnected when the voltage level of at least one of the first and second differential signals corresponding to the given range is higher than the comparison voltage.

BRIEF DESCRIPTION OF THE SEVERAL VIEWS OF THE DRAWING

FIG. 15 is a view showing a modification according to the invention.

DETAILED DESCRIPTION OF THE EMBODIMENT

Figure 1:
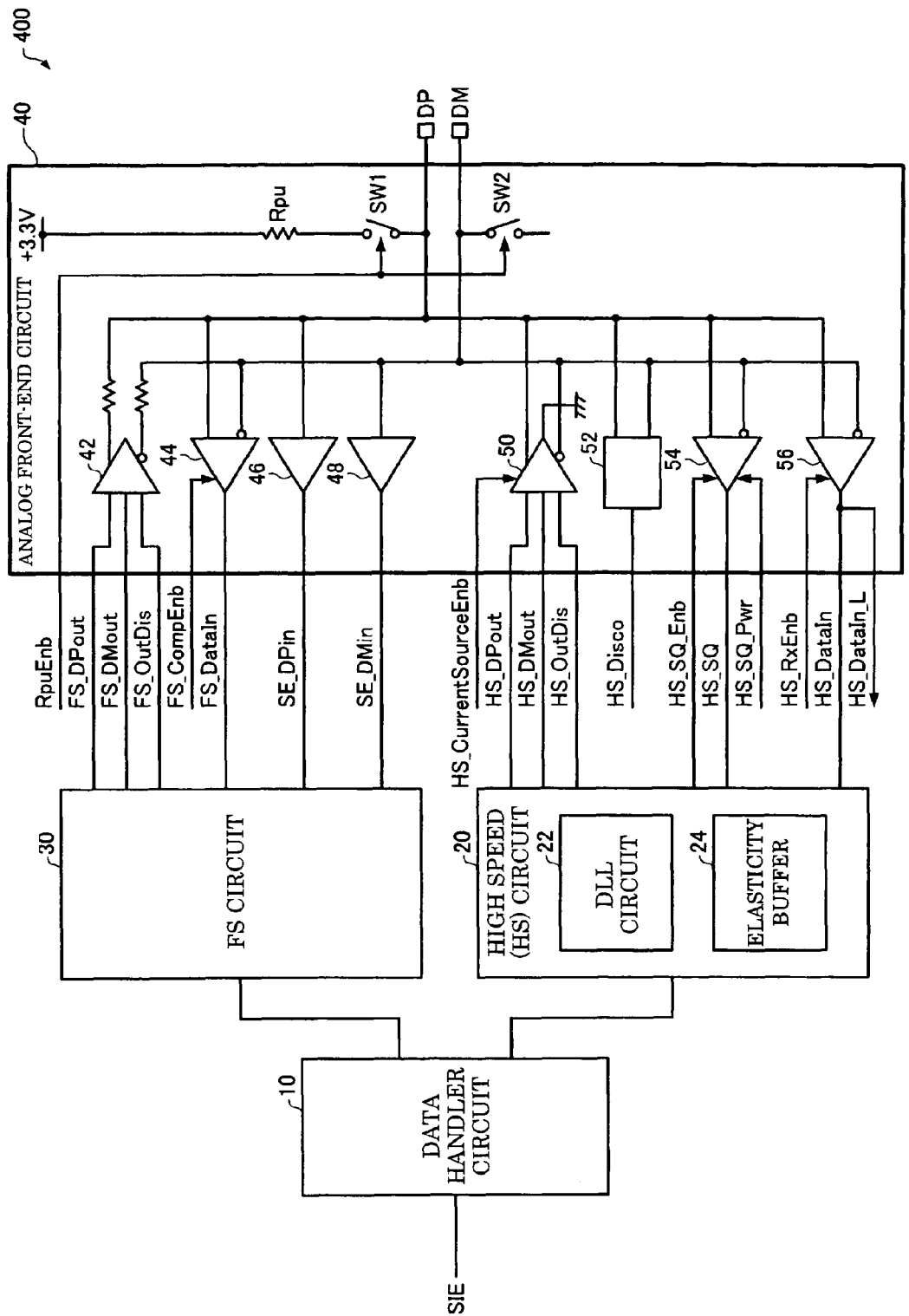
FIG. 1 is a view showing a configuration example of a host controller according to the invention.

The invention was achieved in view of the above-described technical subject. An objective of the invention is to provide a host controller including a disconnection detection circuit which can accurately detect that a host and a device have been disconnected at low power consumption.

One embodiment of the invention relates to a host controller which transfers data through a bus using a differential signal pair and transmits to a device a frame packet defined by a given standard at given intervals defined by the given standard, the host controller comprising:

a disconnection detection circuit which compares a voltage level of a first differential signal of first and second differential signals making up the differential signal pair corresponding to a given range in the frame packet with a comparison voltage, compares a voltage level of the second differential signal corresponding to the given range in the frame packet with the comparison voltage, and detects that a host and a device have been disconnected when the voltage level of at least one of the first and second differential signals corresponding to the given range is higher than the comparison voltage.

This configuration makes it possible to detect that the host and the device have been disconnected when the voltage level of at least one of the first and second differential signals is higher than the comparison voltage, whereby the disconnection can be accurately detected in comparison with the case of monitoring one of the first and second differential signals.

In this host controller, the disconnection detection circuit may receive an enable signal which controls enabling the disconnection detection circuit;

the enable signal may be set to active when a constant current source of a transmitter circuit of the host controller is turned ON and the frame packet is transmitted from the host to the device, and may be set to inactive when the frame packet is not transmitted; and the disconnection detection circuit may monitor whether or not the host and the device have been disconnected when the enable signal is set to active, and may be turned OFF when the enable signal is set to inactive.

This allows the operation of the disconnection detection circuit to be efficiently controlled. For example, since unnecessary current does not flow through the disconnection detection circuit when it is unnecessary to monitor whether or not the host and the device have been disconnected, power consumption can be reduced. Moreover, since the voltage level of the differential signal corresponding to the given range in the frame packet is compared with the comparison voltage, the disconnection detection circuit can be turned OFF when the frame packet is not transmitted. Therefore, a problem can be prevented in which unnecessary current flows through the disconnection detection circuit, whereby power consumption can be reduced.

In this host controller, the disconnection detection circuit may include:

a first comparator which receives the first differential signal, compares the voltage level of the first differential signal corresponding to the given range in the frame packet with the comparison voltage, and detects that the host and the device have been disconnected when the voltage level of the first differential signal corresponding to the given range is higher than the comparison voltage; and a second comparator which receives the first differential signal, compares the voltage level of the second differential signal corresponding to the given range in the frame packet with the comparison voltage, and detects that the host and the device have been disconnected when the voltage level of the second differential signal corresponding to the given range is higher than the comparison voltage; and the disconnection detection circuit may detect that the host and the device have been disconnected when at least one of the first and second comparators has detected that the host and the device have been disconnected.

This configuration allows the disconnection detection circuit to reliably detect that the host and the device have been disconnected when the voltage level of one of the first and second differential signals is higher than the comparison voltage. Moreover, since the parasitic capacitance which affects the first and second differential signals can be balanced by connecting the first and second comparators with the supply side of the first and second differential signals, the signal quality of the differential signals can be improved in comparison with the case of providing the comparator for one of the first and second differential signals.

In this host controller, an output stage of the first and second comparators may include an output fixing switch which fixes its output at a ground level; and the output fixing switch may be turned OFF when the enable signal is set to active, and may be turned ON when the enable signal is set to inactive.

This allows the output level of each comparator to be set at the ground level, even if the operations of the first and second comparators are turned OFF, whereby a problem can be prevented in which the output level of each comparator becomes unstable when turned OFF. Therefore, erroneous detection of the disconnection detection circuit can be prevented.

This host controller may comprise:

a bias signal generation circuit which generates a bias signal which adjusts current sources of the first and second comparators;

wherein the bias signal generation circuit may generate the bias signal when the enable signal is set to active, and may not generate the bias signal when the enable signal is set to inactive.

This allows the current sources of the first and second comparators to be controlled based on the enable signal, whereby power consumption can be reduced.

In this host controller, each of the first and second comparators may include first and second differential amplifiers;

the first differential amplifier may include first and second input transistors provided in parallel between a first power supply and a second power supply of which power supply voltage is higher than that of the first power supply;

the comparison voltage may be input to a gate of the first input transistor;

one of the first and second differential signals may be input to a gate of the second input transistor;

the second differential amplifier may include third and fourth input transistors provided in parallel between the first power supply and the second power supply;

a gate of the fourth input transistor may be connected with a first output node between the first input transistor and the second power supply; and a gate of the third input transistor may be connected with a second output node between the second input transistor and the second power supply.

This allows comparison between the comparison voltage and the voltage level of the differential signal, even if the difference between the comparison voltage and the voltage level of one of the first and second differential signals is small.

In this host controller, the first, second, third, and fourth input transistors may be formed of p-type transistors.

In this host controller, detection results of the first and second comparators may be output based on a voltage level of a third output node between the fourth input transistor and the second power supply.

This allows the comparison result between the comparison voltage and the voltage level of the first or second differential signal to be output as the detection result of the first or second comparator.

In this host controller, the first and second input transistors may be formed of p-type transistors, and the third and fourth input transistors may be formed of n-type transistors.

This allows the third and fourth input transistors of the second differential amplifier to deal with the case where the voltage levels of the first and second output nodes oscillate at a high frequency. Therefore, the disconnection detection circuit can detect disconnection at a high speed.

In this host controller,
each of the first and second comparators may include a second differential amplifier bias signal generation circuit which generates a second differential amplifier bias signal for adjusting a current source of the second differential amplifier; and the second differential amplifier bias signal generation circuit may generate the second differential amplifier bias signal when the enable signal is set to active, and may not generate the second differential amplifier bias signal when the enable signal is set to inactive.

This allows the current source of the second differential amplifier to be efficiently controlled, whereby the power consumption of the disconnection detection circuit can be reduced.

In this host controller, detection results of the first and second comparators may be output based on a voltage level of a third output node between the fourth input transistor and the second power supply.

This allows the comparison result between the comparison voltage and the voltage level of the first or second differential signal to be output as the detection result of the first or second comparator.

In this host controller, the given standard may be the Universal Serial Bus (USB) 2.0 standard.

This allows application of the disconnection detection circuit to products conforming to the USB 2.0 standard.

In this host controller, the frame packet nay be a Start-of-Frame (SOF) packet defined by the USB 2.0 standard.

This allows the disconnection detection circuit to accurately detect disconnection according to the USB 2.0 standard.

In this host controller, the given range may correspond to an End-of-Packet (EOP) defined by the USB 2.0 standard.

Embodiments of the invention are described below with reference to the drawings. Note that the embodiments given below do not in any way limit the scope of the invention laid out in the claims. Note that all elements of the embodiments given below should not necessarily be taken as essential requirements for the invention. In the drawings, sections indicated by the same symbols have the same meanings.

1. USB 2.0

According to the USB 2.0 standard (given standard in a broad sense), a plurality of peripherals (devices) conforming to the USB 1.1 standard or the USB 2.0 standard can be connected with a host through a hub device, for example.

A host controller conforming to the USB 2.0 standard is provided in the host. The host controller determines whether the device connected with the host conforms to the USB 1.1 standard or the USB 2.0 standard, and controls data transfer through a bus.

A hub controller conforming to the USB 2.0 standard is provided in the hub device, for example. The hub controller determines whether the peripheral device connected with the hub device conforms to the USB 1.1 standard or the USB 2.0 standard, and controls the bus transfer method.

A device controller conforming to the standard USB 1.1 standard or the USB 2.0 standard is provided in the peripheral (device). For example, when the device controller conforms to the USB 2.0 standard, the device controller includes a physical layer circuit conforming to the USB 1.1 standard and the USB 2.0 standard, and a logical layer circuit which controls data transfer corresponding to the peripheral in which the device controller is provided.

A host controller according to this embodiment may perform data transfer defined by the USB 2.0 standard through a bus, for example.

2. Host Controller

FIG. 1 shows an example of a configuration of a host controller 400 according to this embodiment.

The host controller 400 includes a logical layer circuit and a physical layer circuit. Note that the host controller 400 is not limited thereto.

The logical layer circuit includes a data handler circuit 10, a high speed (HS) circuit 20, and a full speed (FS) circuit 30. The physical layer circuit includes an analog front-end circuit 40. The host controller 400 need not necessarily include all the circuit blocks shown in FIG. 1. Some of the circuit blocks may be omitted.

The data handler circuit 10 performs various types of transmission and reception processing for data transfer conforming to the USB 2.0 standard. More specifically, the data handler circuit adds a SYNChronization (SYNC), a Start-of-Packet (SOP), and an End-of-Packet (EOP) to transmission data and performs bit stuffing and the like during transmission. The data handler circuit 10 detects and deletes a SYNC, SOP, and EOP of the received data and performs bit unstuffing and the like during reception. The data handler circuit 10 also generates various timing signals for controlling data transmission/reception. The data handler circuit 10 is connected with a serial interface engine (SIE).

The SIE includes an SIE control logic for identifying a USB packet ID and address, and an endpoint logic for performing endpoint processing such as endpoint number identification and FIFO control.

The HS circuit 20 is a logic circuit for transmitting and receiving data in the high speed (HS) mode in which the data transfer rate is 480 Mbps.

The FS circuit 30 is a logic circuit for transmitting and receiving data in the full speed (FS) mode in which the data transfer rate is 12 Mbps.

The analog front-end circuit 40 is an analog circuit including drivers and receivers for transmitting and receiving data in the FS mode and the HS mode. In the USB standard, data is transmitted and received using a differential signal pair made up of a signal DP (Data+, first differential signal in a broad sense) and a signal DM (Data−, second differential signal in a broad sense).

The host controller 400 according to this embodiment further includes a clock signal circuit (not shown) which generates a clock signal having a frequency of 480 MHz used in the HS circuit 20 and a clock signal having a frequency of 60 MHz used in the device and the SIE, and a control circuit (not shown) which generates various control signals for the analog front-end circuit 40.

The HS circuit 20 includes a delay line PLL (DLL) circuit 22 and an elasticity buffer 24.

The DLL circuit 22 generates a data sampling clock signal based on a clock signal generated by the clock signal circuit (not shown) and the received signal.

The elasticity buffer 24 is a circuit for absorbing the difference in clock signal frequency (clock drift) between the device and an external device (external device connected with the bus) and the like.

In the USB 2.0 standard, the HS mode and the FS mode are defined as the transfer modes. The HS mode is a transfer mode additionally defined in the USB 2.0 standard. The FS mode is a transfer mode which has been defined in the USB 1.1 standard.

In the HS mode, the data handler circuit 10 and the analog front-end circuit 40 transmit and receive data through the HS circuit 20.

In the FS mode, the data handler circuit 10 and the analog front-end circuit 40 transmit and receive data through the FS circuit 30.

Therefore, HS-mode drivers and receivers for transmitting and receiving the pair of differential transmission/reception signals DP and DM in the HS mode and FS-mode drivers and receivers for transmitting and receiving the pair of differential transmission/reception signals DP and DM in the FS mode are separately provided in the analog front-end circuit 40.

More specifically, the analog front-end circuit 40 includes an FS driver 42, FS differential data receiver 44, SE (Single Ended)_DP receiver 46, SE_DM receiver 48, HS current driver 50, disconnection detection circuit 52, HS_SQ circuit 54, and HS differential data receiver 56.

The FS driver 42 outputs a pair of differential transmission signals FS_DPout and FS_DMout from the FS circuit 30 as the pair of differential transmission signals DP and DM in the FS mode. The output of the FS driver 42 is controlled using a signal FS_OutDis from the FS circuit 30.

The FS differential receiver 44 amplifies the pair of differential reception signals DP and DM in the FS mode, and outputs a signal FS_DataIn to the FS circuit 30. The amplification of the FS differential receiver 44 is controlled using a signal FS_CompEnb.

The SE_DP receiver 46 amplifies the single-ended reception signal DP in the FS mode, and outputs a signal SE_DPin to the FS circuit 30.

The SE_DM receiver 48 amplifies the single-ended reception signal DM in the FS mode, and outputs a signal SE_DMin to the FS circuit 30.

The HS current driver 50 amplifies a pair of differential transmission signals HS_DPout and HS_DMout from the HS circuit 20 in the HS mode, and outputs the pair of differential transmission signals DP and DM. The output of the HS current driver 50 is controlled using a signal HS_OutDis from the HS circuit 20, and the drive current of the HS current driver 50 is controlled using a signal HS_CurrentSourceEnb.

The disconnection detection circuit 52 monitors the connection state between the host and the device in the HS mode, and outputs a signal HS_Disco as the disconnection detection result when the host and the device are disconnected. The details of the disconnection detection circuit 52 are described later.

The HS_SQ circuit 54 detects the presence or absence of the pair of differential reception signals DP and DM in the HS mode, and outputs a signal HS_SQ to the HS circuit 20 as the signal detection result. The operation of the HS_SQ circuit 54 is controlled using a signal HS_SQ_Enb from the HS circuit 20. The power consumption of the HS_SQ circuit 54 may be controlled using a signal HS_SQ_Pwr.

The HS differential data receiver 56 amplifies the pair of differential reception signals DP and DM in the HS mode, and outputs signals HS_DataIn and HS_DataIn_L. The amplification of the HS differential receiver 56 is controlled using a signal HS_RxEnb.

The signal DP of the pair of differential transmission/reception signals DP and DM is (electrically) connected with a power supply voltage of 3.3 V through a switch SW1 and a pull-up resistor Rpu. The signal DM of the pair of differential transmission/reception signals is connected with a switch SW2. The switches SW1 and SW2 are controlled using a signal RpuEnb. The signal DM may also be pulled up through a resistor similar to the pull-up resistor Rpu via the switch SW2, taking the load balance into consideration. The signal RpuEnb causes at least the signal DP to be connected with the pull-up resistor Rpu through the switch SW1 in the FS mode.

As described above, the data transfer control device includes the drivers and receivers corresponding to the transfer rates in the HS mode and the FS mode.

3. Disconnection Detection 3.1. SOF

In the USB 2.0 standard, a Start-of-Frame (SOF) packet is transmitted from the host controller to the device at given intervals. The given interval is defined by the USB 2.0 standard.

The SOF packet transmitted from the host includes a SYNC field, a packet identifier (PID) field, a frame number field, a CRC5 field, and an End-of-Packet (EOP) field, and has a total length of 96 bits. The SYNC has a length of 32 bits. The PID indicates the packet transmitted. When the packet is an SOF packet, the PID is set at A5h. The frame number indicates the frame number of the SOF packet. In the HS mode defined by the USB 2.0 standard, the frame number is incremented by one in eight microframe units. The CRC5 is five-bit cyclic redundancy check data which is added to detect a bit error. The CRC5 is used to protect the data in the frame number field. The CRC5 allows a bit error to be detected with an efficiency higher than that of a parity check.

The EOP is set at 40 bits in the HS mode. The EOP is continuously set in a K or J state over 40 bits. In the USB 2.0 standard, the K state indicates a state in which the signal DM is set at a high level and the signal DP is set at a low level. The J state indicates a state in which the signal DP is set at a high level and the signal DM is set at a low level. The EOP is set in the K or J state depending on the data in the frame number field and the CRC5 field. In the USB 2.0 standard, data other than the EOP cannot be continuously set in a single state (K or J state) over eight bits or more.

Figure 2:
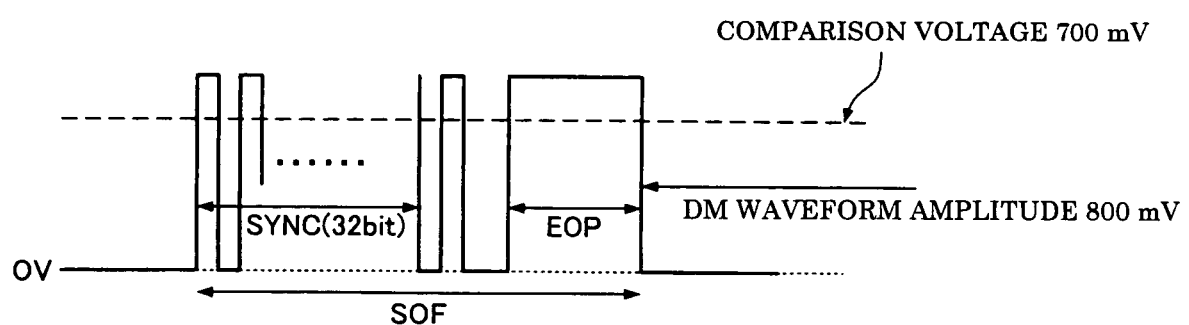
FIG. 2 is a view illustrative of an SOF packet.

FIG. 2 is a view illustrative of the SOF packet defined by the USB 2.0 standard. FIG. 2 schematically shows the waveform amplitude of the signal DM instead of the measured signal waveform for convenience of illustration. In FIG. 2, data (PID, frame number, and CRC5) is omitted. FIG. 2 illustrates the waveform amplitude of the signal DM when the host and the device are disconnected.

Figure 3A:
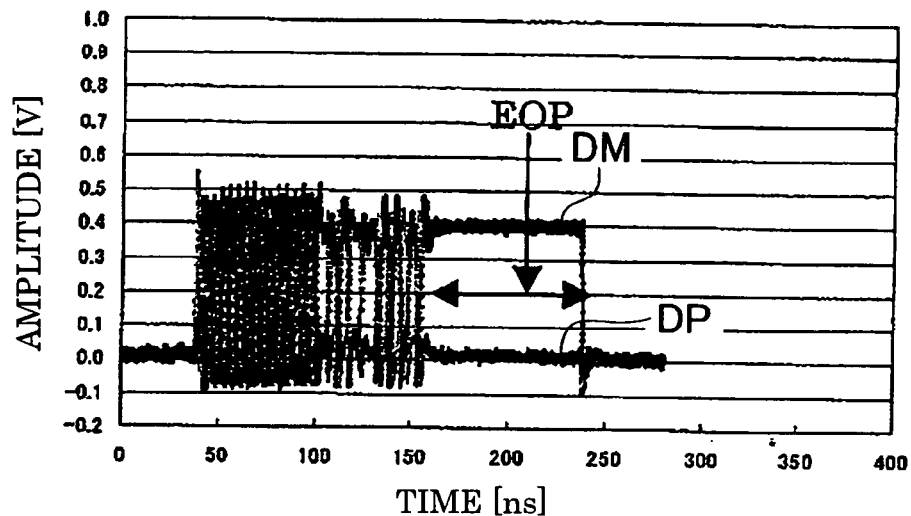
FIG. 3A is a waveform diagram of an SOF packet in a connection state.
Figure 3B:
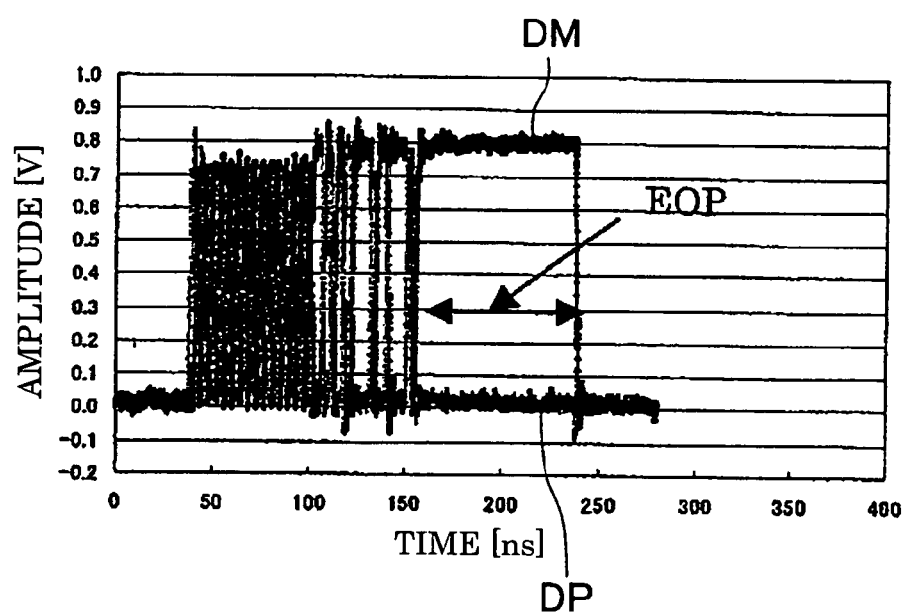
FIG. 3B is a waveform diagram of an SOF packet in a disconnection state.

In the USB 2.0 standard, when the host and the device are connected, the signals DP and DM of the host controller 400 ideally have an amplitude of 400 mV. As shown in FIG. 3A, an amplitude of 400 mV is observed for the EOP. When the host and the device are disconnected, the signals DP and DM of the host controller 400 ideally have an amplitude of 800 mV. As shown in FIG. 3B, an amplitude of 800 mV is observed for the EOP. This is because the device-side termination resistor is disconnected from the host when the host and the device are disconnected.

Specifically, as shown in FIG. 2, the disconnection state can be detected by setting a comparison voltage at 700 mV and comparing the waveform amplitude level of the SOF packet with the comparison voltage, for example.

The USB 2.0 standard specifies that it is detected that the host and the device are disconnected when the amplitude level of the EOP of the SOF packet exceeds 525 to 625 mV, but does not provide for a specific detection method.

3.2. Disconnection Detection Circuit of Comparative Example

Figure 4:
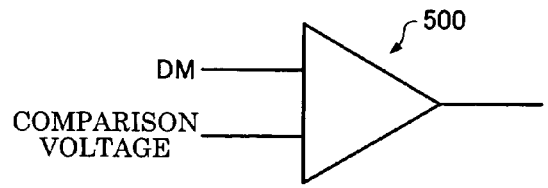
FIG. 4 is a view showing a configuration example of a disconnection detection circuit of a comparative example according to the invention.

FIG. 4 shows a disconnection detection circuit 500 according to a comparative example. The disconnection detection circuit 500 shown in FIG. 4 compares the amplitude level of the signal DM or DP (e.g. DM) with the comparison voltage, and outputs the detection result. This makes it possible to detect that the host and the device are connected or disconnected when the waveform shown in FIG. 3A or 3B has been transmitted as the SOF packet.

In regard to the amplitude of the EOP of the SOF packet, since the signals DP and DM are differential signals, the signal DM is set at a low level when the signal DP is set at a high level. The signal DP is set at a low level when the signal DM is set at a high level. Specifically, the disconnection detection circuit 500 according to the comparative example which monitors only the amplitude of the signal DM cannot properly detect that the host and the device are disconnected when the amplitude level of the signal DM of the EOP of the SOF packet is set at a low level. In this case, the disconnection cannot be properly detected until an SOF packet in which the amplitude level of the signal DM of the EOP is set at a high level is transmitted.

The disconnection detection circuit 500 according to the comparative example is connected with the host-side DM signal line, but is not connected with the host-side DP signal line. Since the HS mode defined by the USB 2.0 standard is a mode in which data is transferred at a high speed, a high accuracy is required for the DP and DM signal lines to which the differential signals are output. For example, in order to accurately read data from the differential signals, it is important to ensure that an equal capacitance and resistance are added to the DP and DM signal lines.

In the comparative example, the disconnection detection circuit 500 is connected with the host-side DM signal line, and the gate capacitance of an input transistor of the disconnection detection circuit 500 is added to the DM signal line, for example. On the other hand, since the disconnection detection circuit 500 according to the comparative example is not connected with the host-side DP signal line, the host-side DP and DM signal lines differ in capacitance (e.g. wiring capacitance) to a large extent. When the DP and DM signal lines differ in capacitance, the eye pattern of the differential signals is disturbed, whereby the signal quality deteriorates. Moreover, when the host-side DP and DM signal lines differ in capacitance, not only the quality of the differential signals transmitted from the host to the device, but also the quality of the differential signals transmitted from the device to the host deteriorates. As described above, the disconnection detection circuit 500 according to the comparative example causes the signal quality of the differential signals transferred between the host and the device to deteriorate.

The waveforms shown in FIGS. 3A and 3B are approximately the ideal waveforms of the SOF packet when the termination resistors of the host and the device and a connection section (e.g. connection cable) connecting the host and the device conform to the USB 2.0 standard.

A product which does not conform to the USB 2.0 standard may be put on the market. For example, when at least one of the DP-side termination resistor and the DM-side termination resistor of the device does not conform to the USB 2.0 standard, the waveform of the SOF packet is disturbed. For example, when the DP-side termination resistor of the device conforms to the USB 2.0 standard and the DM-side termination resistor of the device does not conform to the USB 2.0 standard, signal reflection occurs through the DM signal line of the device, whereby the waveform of the signal DM of the SOF packet is disturbed. As a result, the amplitude of the signal DM of the EOP of the SOF packet significantly differs from the ideal state. Therefore, the disconnection detection circuit 500 according to the comparative example which monitors only the signal DM may not properly detect the disconnection state.

3.3. Disconnection Detection Circuit

Figure 5:
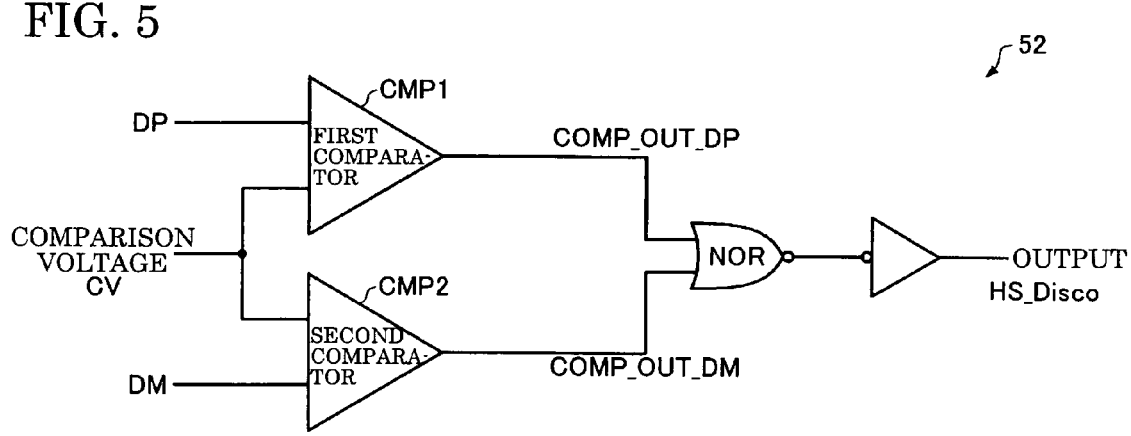
FIG. 5 is a view showing a configuration example of a disconnection detection circuit according to the invention.

FIG. 5 shows a disconnection detection circuit 52 according to the invention. The disconnection detection circuit 52 includes first and second comparators CMP1 and CMP2. The first comparator CMP1 compares the signal level of the signal DP with a comparison voltage CV, and outputs a detection signal COMP_OUT_DP as the comparison result. The second comparator CMP2 compares the signal level of the signal DM with the comparison voltage CV, and outputs a detection signal COMP_OUT_DM as the comparison result.

The detection signals COMP_OUT_DP and COMP_OUT_DM are input to a NOR circuit, and the output signal from the NOR circuit is output as a disconnection detection signal HS_Disco through an inverter. The NOR circuit and the inverter of the disconnection detection circuit 52 are only an example. The disconnection 10 detection circuit 52 may be configured by replacing the NOR circuit and the inverter with an OR circuit, for example.

The disconnection detection circuit 52 according to the invention compares the signal levels of the signals DP and DM with the comparison voltage CV using the respective comparators, and outputs the disconnection detection signal HS_Disco set to active when at least one of the comparators CMP1 and CMP2 has detected a disconnection state, for example.

This allows the signal waveforms of the signals DP and DM to be monitored, whereby it is possible to accurately detect that the host and the device are disconnected irrespective of whether the EOP is in the K or J state. The first and second comparators CMP1 and CMP2 may be formed using the same type of circuits. Therefore, the parasitic capacitances (e.g. wiring capacitance) of the DP and DM signal lines can be equalized, whereby deterioration of the signal quality can be reduced in comparison with the comparative example shown in FIG. 4.

3.3.1. First Embodiment (Specific Example of Disconnection Detection Circuit)

Figure 6:
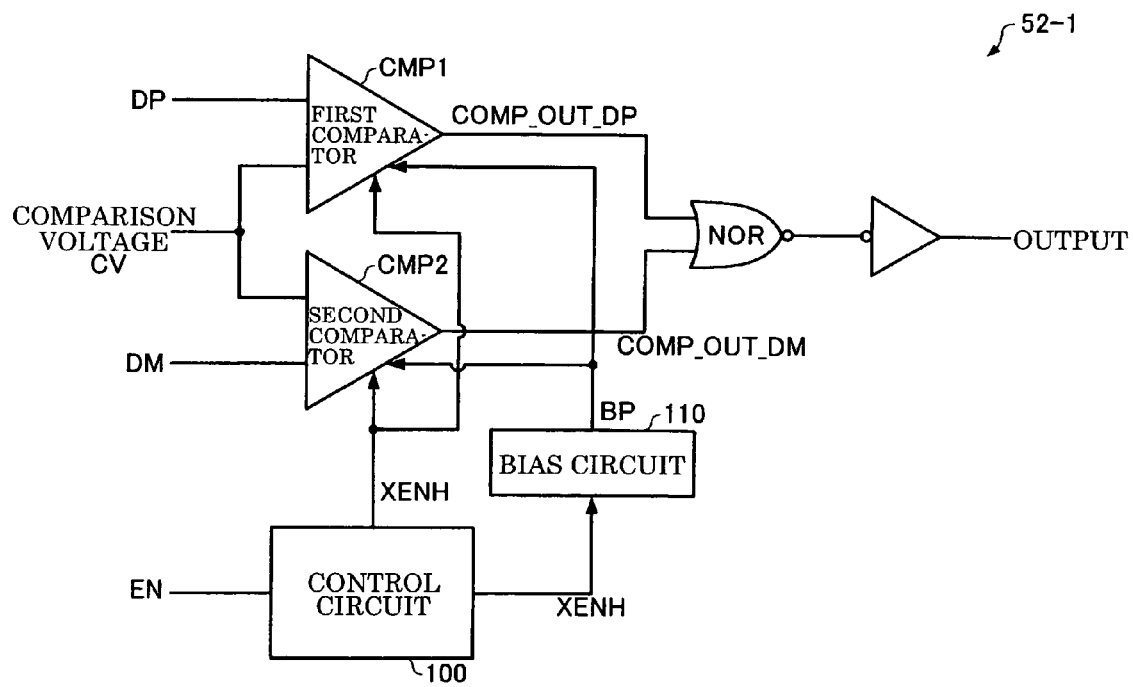
FIG. 6 is a view showing a disconnection detection circuit according to a first embodiment of the invention.

FIG. 6 shows a specific configuration example of the disconnection detection circuit 52. A disconnection detection circuit 52-1 shown in FIG. 6 is a disconnection detection circuit according to a first embodiment. The disconnection detection circuit 52-1 includes the first and second comparators CMP1 and CMP2, a control circuit 100, and a bias circuit 110 (bias signal generation circuit in a broad sense). Note that the configuration of the disconnection detection circuit 52-1 is not limited thereto. For example, the disconnection detection circuit 52-1 may not include the control circuit 100.

The control circuit 100 receives an enable signal EN from the higher-level circuit (e.g. data handler circuit 10 in FIG. 1), and supplies a control signal XENH to the first and second comparators CMP1 and CMP2 and the bias circuit 110 based on the enable signal EN. When the control circuit 100 has received the enable signal EN set to active, the control circuit 100 sets the control signal XENH to active. When the control circuit 100 has received the enable signal EN set to inactive, the control circuit 100 sets the control signal XENH to inactive.

The bias circuit 110 generates a bias signal BP based on the control signal XENH from the control circuit 100, and outputs the bias signal BP to the first and second comparators CMP1 and CMP2. In more detail, when the control signal XENH is set to active, the bias circuit 110 sets the bias signal BP from a high level to a low level. When the control signal XENH is set to inactive, the bias circuit 110 causes the bias signal BP to remain at a high level.

Current sources of the first and second comparators CMP1 and CMP2 are adjusted based on the signal level of the bias signal BP. In more detail, the current sources of the comparators CMP1 and CMP2 are turned ON when the bias signal BP is set at a low level, and are turned OFF when the bias signal BP is set at a high level.

When the control signal XENH from the control circuit 100 is set to active, the first and second comparators CMP1 and CMP2 output the comparison result between the signal DP (DM) and the comparison voltage CV as the detection signal COMP_OUT_DP (COMP_OUT_DM). When the control signal XENH is set to inactive, the first and second comparators CMP1 and CMP2 set the signal levels of the detection signals COMP_OUT_DP and COMP_OUT_DM at a low level.

Specifically, the detection signals COMP_OUT_DP and COMP_OUT_DM of the comparators CMP1 and CMP2 are set as the comparison result between the signal DP (DM) and the comparison voltage CV or the low-level signal based on the enable signal EN. For example, the enable signal EN is set to inactive when turning OFF the disconnection detection circuit 52-1.

Since the disconnection detection circuit 52-1 can operate at a low power consumption, the output levels of the comparators CMP1 and CMP2 may become unstable even if the disconnection detection circuit 52-1 is turned OFF. According to this embodiment, since the outputs from the comparators CMP1 and CMP2 are set as the low-level signals when the enable signal EN is set to inactive, a situation can be prevented in which the comparators CMP1 and CMP2 erroneously detect a disconnection state when the disconnection detection circuit 52-1 is turned OFF.

The enable signal EN is set to active when a packet is transmitted from the host to the device and the packet transmitted is an SOF packet. This minimizes the power consumption of the disconnection detection circuit 52-1 when an SOF packet is not transmitted from the host or no packet is transmitted from the host. For example, when enable signal EN has been set to inactive, the bias signal BP output from the bias circuit 110 is set at a high level. Therefore, the current sources of the first and second comparators CMP1 and CMP2 are turned OFF, whereby unnecessary current consumption can be prevented when the disconnection detection circuit 52-1 need not operate.

(Comparator)

Figure 7:
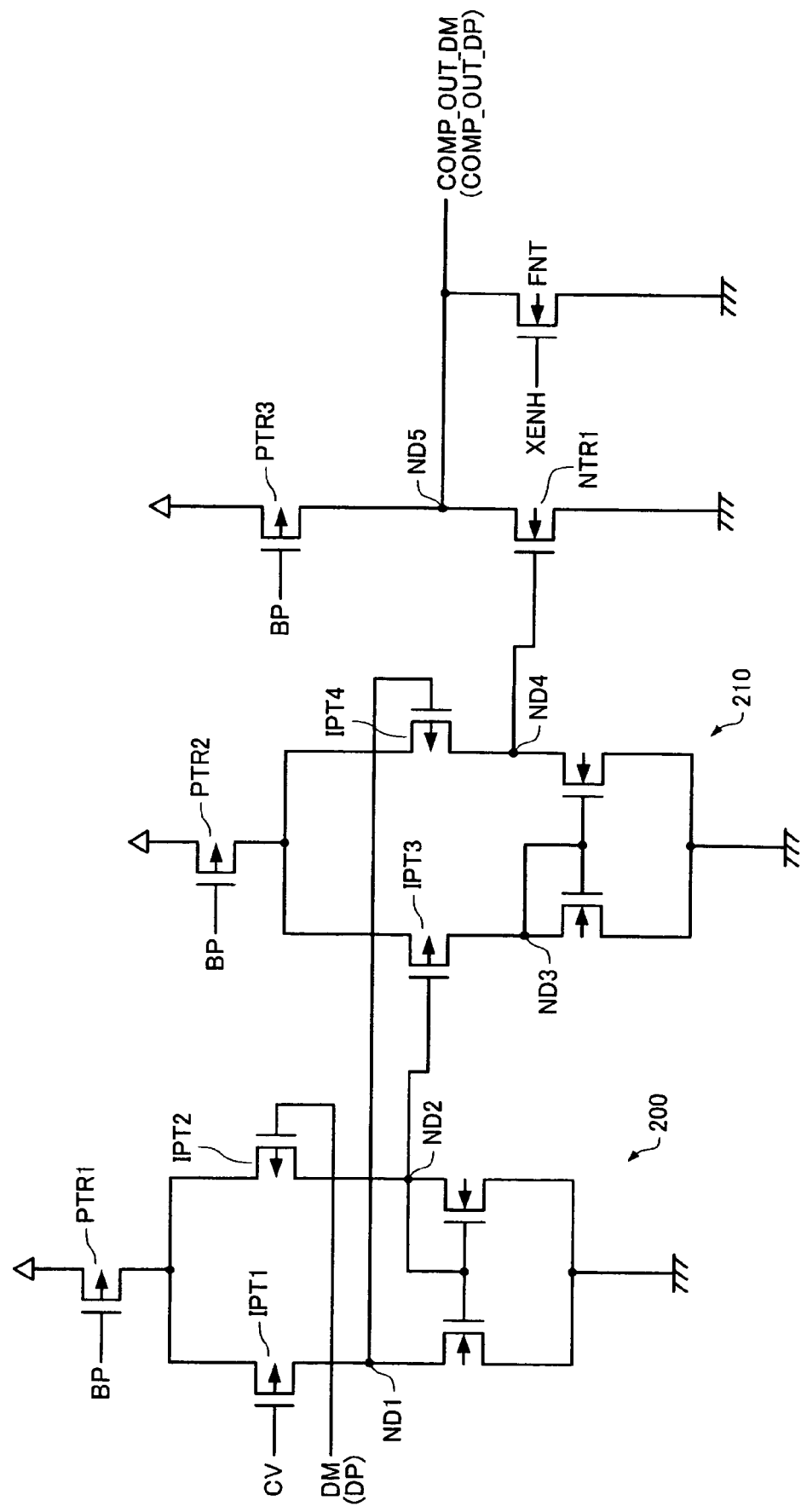
FIG. 7 is a view showing a circuit configuration of a comparator according to the first embodiment.

FIG. 7 shows a configuration example of the first comparator CMP 1. Note that the second comparator CMP2 has the same circuit configuration as the first comparator CMP1. The comparator CMP1 includes p-type MOS transistors PTR1 to PTR3 (current sources in a broad sense) and n-type MOS transistors FNT (output fixing switch in a broad sense) and NTR1. The comparator CMP1 includes a first differential amplifier 200 and a second differential amplifier 210. The bias signal BP supplied from the bias circuit 110 in FIG. 6 is input to the gates of the transistors PTR1 to PTR3. Current supplied to the differential amplifiers 200 and 210 and current supplied to a node ND5 are adjusted based on the voltage level of the bias signal BP.

The control signal XENH supplied from the control circuit 100 in FIG. 6 is input to the gate of the n-type MOS transistor FNT. When the control circuit 100 receives the enable signal EN set to active, the control circuit 100 sets the control signal XENH to active, as described above. In this case, the control signal XENH is set at a low level, for example. This allows the bias signal BP set at a low level to be supplied to the comparators CMP1 and CMP2 from the bias circuit 110, for example. The n-type transistor FNT in FIG. 7 which has received the control signal XENH set at a low level is turned OFF, whereby the comparison result between the voltage level of the differential signal DM (DP) and the comparison voltage CV is output as the detection signal COMP_OUT_DM (COMP_OUT_DP). The first differential amplifier 200 includes a first input transistor IPT1 and a second input transistor IPT2. The first and second input transistors IPT1 and IPT2 are formed of p-type MOS transistors. The comparison voltage CV is input to the gate of the first input transistor IPT1. The differential signal DM (DP) is input to the gate of the second bathing transistor IPT2.

The second differential amplifier 210 includes a third input transistor IPT3 and a fourth input transistor IPT4. The third and fourth input transistors IPT3 and IPT4 are formed of p-type MOS transistors. The gate of the third input transistor IPT3 is connected with a node ND2 (second output node in a broad sense) of the first differential amplifier 200. The gate of the fourth input transistor IPT4 is connected with a node ND1 (first output node in a broad sense) of the first differential amplifier 200.

The gate of the n-type transistor NTR1 is connected with a node ND4 of the second differential amplifier 210.

When the enable signal EN supplied to the control circuit 100 in FIG. 6 has been set to active, the bias signal BP of the bias circuit 110 is set to active. This allows the p-type transistors PTR1 to PTR3 of the comparators CMP1 and CMP2 to be turned ON, whereby the differential amplifiers 200 and 210 of the comparators CMP1 and CMP2 operate. The potential of the node ND4 (third output node in a broad sense) of the second differential amplifier 210 changes corresponding to the difference between the comparison voltage CV and the signal level of the differential signal DM (DP). The n-type transistor NTR1 is controlled corresponding to the potential of the node ND4, and the comparison result between the comparison voltage CV and the differential signal DM (DP) is output as the detection signal COMP_OUT_DM (COMP_OUT_DP).

The operation of the comparators CMP1 and CMP2 is described below using waveform diagrams shown in FIGS. 8A to 8D and FIGS. 9A to 9D. FIGS. 8A to 8D are waveform diagrams when the host and the device are connected, and FIGS. 9A to 9D are waveform diagrams when the host and the device are disconnected. In FIGS. 8A to 8D and FIGS. 9A to 9D, the comparison voltage CV is set at 600 mV (see FIG. 8A), for example.

Figure 8A:
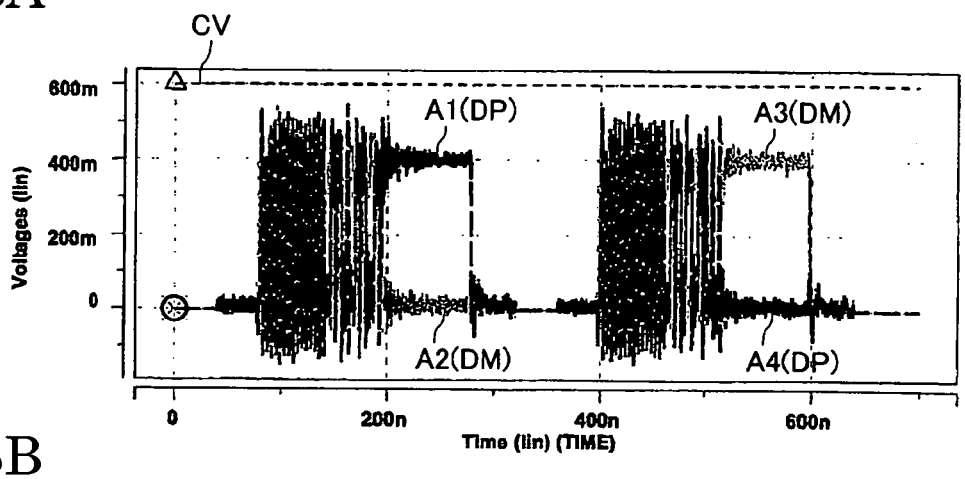
FIGS. 8A to 8D are waveform diagrams illustrative of the operation of the disconnection detection circuit according to the first embodiment in a connection state.

In FIG. 8A, A1 indicates the EOP of the differential signal DP, and A2 indicates the EOP of the differential signal DM, for example. In FIG. 8A, A3 indicates the EOP of the differential signal DM, and A4 indicates the EOP of the differential signal DP, for example.

The operation of the disconnection detection circuit 52-1 when the host and the device are not disconnected is described below. When the host and the device are connected, the voltage levels of the differential signals DP and DM when the SOF packet has been transmitted are lower than the voltage level of the comparison voltage CV in a period corresponding to the EOP, as indicated by A1 and A3 in FIG. 8A.

In this case, the disconnection detection circuit 52 must output a signal indicating that the host and the device are connected.

Figure 8B:
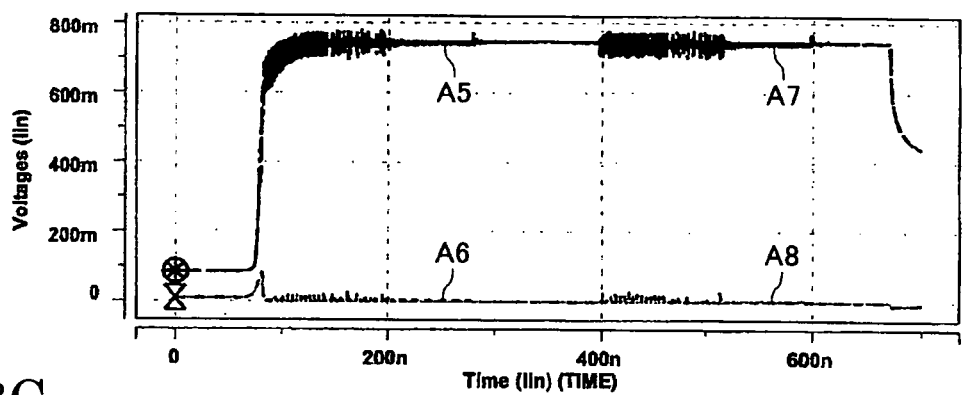
Figure 8C:
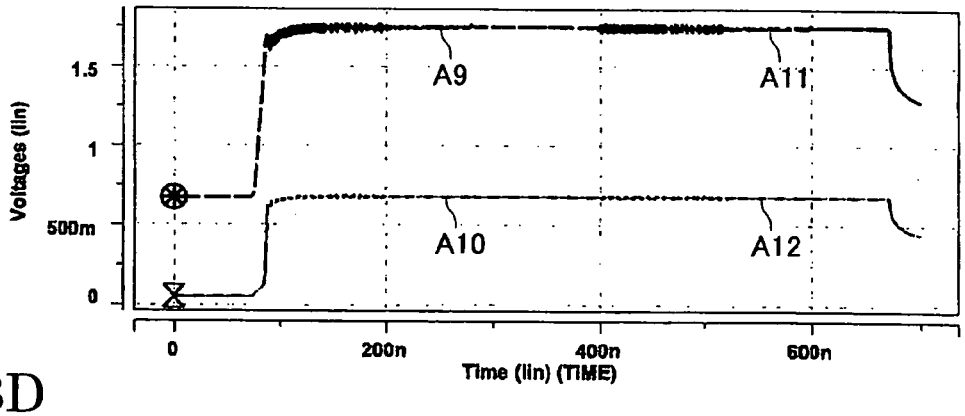

In this case, the voltage levels of the nodes ND1 of the comparators CMP1 and CMP2 in FIG. 7 are set at a low level, as indicated by A6 and A8 in FIG. 8B, and the voltage levels of the nodes ND2 are set at a high level, as indicated by A5 and A7. This is because the voltage level input to the gate of the input transistor IPT1 is higher than the voltage level input to the gate of the input transistor IPT2. FIG. 8B is a waveform diagram showing the voltage levels of the nodes ND1 and ND2 in FIG. 7. A5 to A8 indicate the voltage levels of the nodes ND1 and ND2 in a period corresponding to the EOP of the differential signals DP and DM.

Accordingly, the high-level voltage is input to the gate of the input transistor IPT3 of the differential amplifier 210 in FIG. 7, and the low-level voltage is input to the gate of the input transistor IPT4. Therefore, the voltage level of the node ND4 is set at a high level, as indicated by A9 and A11 in FIG. 8C. The voltage level of the node ND3 is set at a low level, as indicated by A10 and A12 in FIG. 8C.

Since the voltage level of the node ND4 is set at a high level, the n-type transistor NTR1 is turned ON, whereby the voltage level of the node ND5 changes to the ground level. Therefore, the voltage levels of the detection signals COMP_OUT_DM and COMP_OUT_DP of the comparators CMP1 and CMP2 are set at a low level, as indicated by A13 in FIG. 8D. Specifically, the disconnection detection circuit 52-1 in FIG. 6 can output the detection signal indicating that the host and the device are not disconnected without erroneously detecting disconnection when the host and the device are connected.

A14 indicates the voltage level of the enable signal EN in FIG. 6. The enable signal EN is set at a high level (active) when detecting disconnection, and the bias signal BP is set at a low level from a high level, as indicated by A15 in FIG. 8D. This allows current to flow between the source and the drain of each of the transistors PTR1 to PTR3 in FIG. 7.

The operation of the disconnection detection circuit 52-1 when the host and the device are disconnected is described below. When the host and the device are disconnected, the voltage levels of the differential signals DP and DM when the SOF packet has been transmitted are higher than the voltage level of the comparison voltage CV in a period corresponding to the EOP, as indicated by B1 and B3 in FIG. 9A. In this case, the disconnection detection circuit 52 must output a signal indicating that the host and the device are disconnected.

Figure 9A:
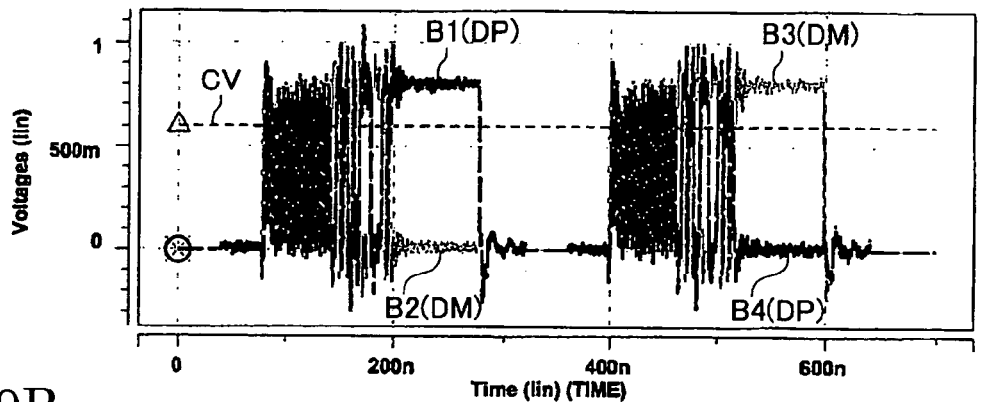
FIGS. 9A to 9D are waveform diagrams illustrative of the operation of the disconnection detection circuit according to the first embodiment in a disconnection state.

For example, when the differential signals DP and DM of the EOP of the SOF packet are in a state as indicated by B1 and B2 in FIG. 9A, the comparison voltage CV is input to the gate of the input transistor IPT1 of the comparator CMP1 in FIG. 7, and the differential signal DP of which the voltage level is higher than that of the comparison voltage CV, as shown in FIG. 9A, is input to the gate of the input transistor IPT2 of the comparator CMP1.

Figure 9B:
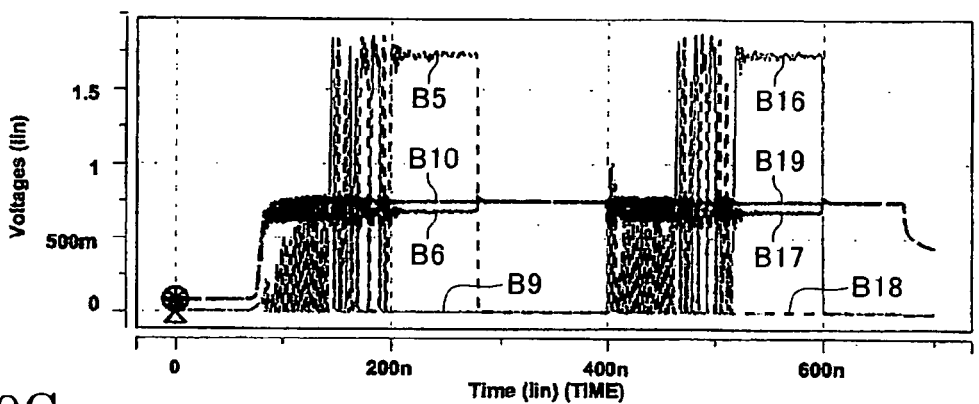

This allows the voltage level of the node ND1 of the comparator CMP1 in FIG. 7 to be set at a high level, as indicated by B5 in FIG. 9B, and allows the voltage level of the node ND2 of the comparator CMP1 to be set at a low level, as indicated by B6. Therefore, the low-level voltage is input to the gate of the input transistor IPT3 of the differential amplifier 210 of the comparator CMP1, and the high-level voltage is input to the gate of the input transistor IPT4. Specifically, the voltage level of the node ND3 of the differential amplifier 210 becomes higher than the voltage level of the node ND4 (B8), as indicated by B7 in FIG. 9C, and the voltage level of the node ND4 is set at a low level, as indicated by B8 in FIG. 9C.

Therefore, since the low-level voltage is input to the gate of the n-type transistor NTR1 of the comparator CMP1 in FIG. 7, the node ND5 in FIG. 7 is set at a voltage level adjusted by the p-type transistor PTR3, whereby the detection signal COMP_OUT_DP of the comparator CMP1 is set at a high level.

In the comparator CMP2 to which the differential signal DM is input, the comparison voltage CV is input to the gate of the input transistor IPT1 of the comparator CMP2 in FIG. 7, and the differential signal DM of which the voltage level is lower than that of the comparison voltage CV, as indicated by B2 in FIG. 9A, is input to the gate of the input transistor IPT2 of the comparator CMP2.

This allows the voltage level of the node ND1 of the comparator CMP2 in FIG. 7 to be set at a low level, as indicated by B9 in FIG. 9B, and allows the voltage level of the node ND2 of the comparator CMP1 to be set at a high level, as indicated by B10. Therefore, the high-level voltage is input to the gate of the input transistor IPT3 of the differential amplifier 210 of the comparator CMP2, and the low-level voltage is input to the gate of the input transistor IPT4. Specifically, the voltage level of the node ND3 of the differential amplifier 210 becomes lower than the voltage level of the node ND4 (B12), as indicated by B11 in FIG. 9C, and the voltage level of the node ND4 is set at a high level, as indicated by B12 in FIG. 9C.

This allows the high-level voltage to be input to the gate of the n-type transistor NTR1 of the comparator CMP2 in FIG. 7, whereby the voltage level of the node ND5 in FIG. 7 changes to the ground level in the same manner as in the case where the host and the device are connected as described above.

The voltage level of the detection signal COMP_OUT_DP of the comparator CMP1 is thus set at a high level, and the detection signal COMP_OUT_DM of the comparator CMP2 is set at a low level. Specifically, the disconnection detection circuit 52-1 outputs a high-level signal indicating that the host and the device are disconnected, as indicated by B13 in FIG. 9D. The above is detection of disconnection when the voltage level of the differential signal DP has exceeded the voltage level of the comparison voltage CV, as indicated by B1 in FIG. 9A. The disconnection detection circuit 52-1 can detect disconnection immediately after comparing the differential signal DP indicated by B1 in FIG. 9A with the comparison voltage CV, as indicated by B13 in FIG. 9D.

Figure 8D:
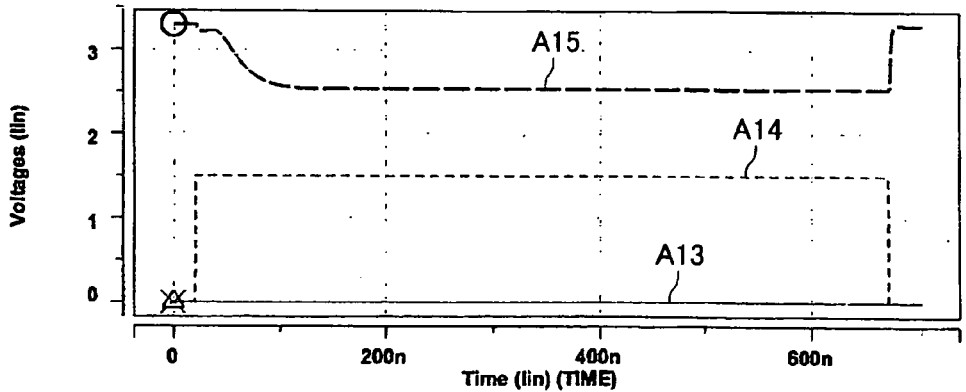
Figure 9C:
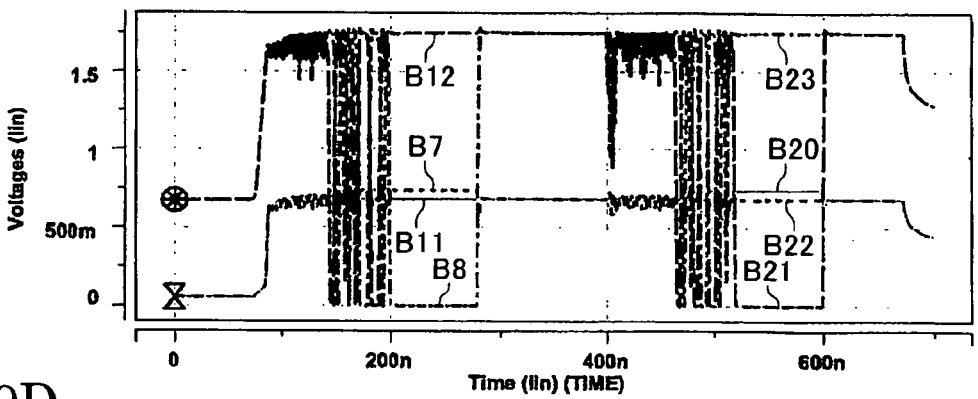
Figure 9D:
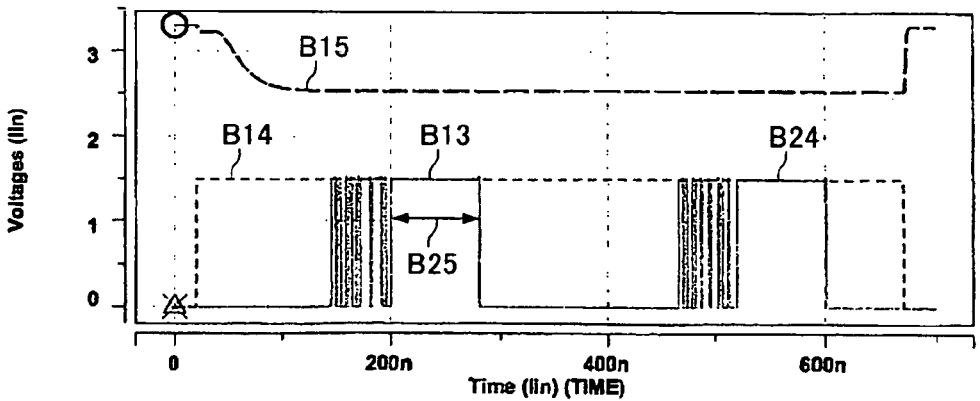

B14 in FIG. 9D indicates the voltage level of the enable signal EN in FIG. 6 in the same manner as in FIG. 8D, and B15 indicates the bias signal BP.

When the voltage level of the differential signal DM is higher than the voltage level of the comparison voltage CV, and the voltage level of the differential signal DP is lower than the voltage level of the comparison voltage CV in a period corresponding to of the EOP of the SOF packet, as indicated by B3 and B4 in FIG. 9A, the comparison voltage CV is input to the gate of the input transistor IPT1 of the comparator CMP1 in FIG. 7, and the differential signal DM of which the voltage level is higher than that of the comparison voltage CV, as shown in FIG. 9A, is input to the gate of the input transistor IPT2 of the comparator CMP1.

In this case, the operation of the disconnection detection circuit 52-1 is approximately the same as that when the voltage level of the differential signal DP of is higher than the voltage level of the comparison voltage CV, in which only the waveforms indicating the voltage levels of the nodes ND1 to ND4 are interchanged between the comparators CMP1 and CMP2.

For example, B16 in FIG. 9B indicates the voltage level of the node ND1 of the comparator CMP2, and B17 indicates the voltage level of the node ND2 of the comparator CMP2. B18 indicates the voltage level of the node ND1 of the comparator CMP1, and B19 indicates the voltage level of the node ND2 of the comparator CMP1.

Likewise, B20 in FIG. 9C indicates the voltage level of the node ND3 of the comparator CMP2, and B21 indicates the voltage level of the node ND4 of the comparator CMP2. B22 indicates the voltage level of the node ND3 of the comparator CMP1, and B23 indicates the voltage level of the node ND4 of the comparator CMP1.

As a result, since the high-level voltage is input to the gate of the n-type transistor NTR1 of the comparator CMP1 in FIG. 7, the detection signal COMP_OUT_DP of the comparator CMP1 is set at a low level. Since the low-level voltage is input to the gate of the n-type transistor NTR1 of the comparator CMP2, the detection signal COMP_OUT_DM of the comparator CMP2 is set at a high level. Specifically, the disconnection detection circuit 52-1 outputs a high-level signal indicating disconnection detection, as indicated by B2 in FIG. 9D.

Specifically, the disconnection detection circuit 52-1 can also immediately detect disconnection when the voltage level of the differential signal DM has exceeded the voltage level of the comparison voltage CV.

As described above, the disconnection detection circuit 52-1 can immediately detect that the host and the device are disconnected when the voltage level of at least one of the differential signals DP and DM has exceeded the voltage level of the comparison voltage CV.

Figure 10:
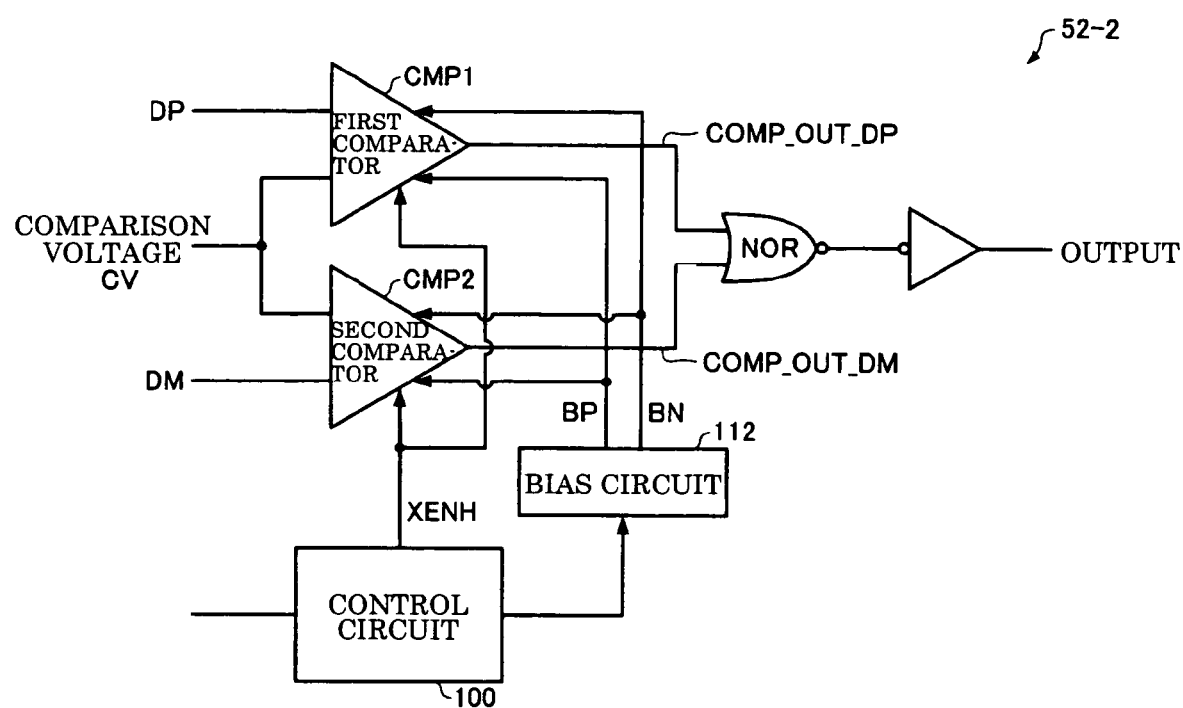
FIG. 10 is a view showing a configuration example of a disconnection detection circuit according to a second embodiment.

3.3.2. Second Embodiment (Specific Example of Disconnection Detection Circuit)
FIG 10 shows a specific configuration example of a second embodiment of the disconnection detection circuit 52. A disconnection detection circuit 52-2 shown in FIG 10 includes the first and second comparators CMP1 and CMP2, the control circuit 100, and a bias circuit 112 (bias signal generation circuit or second differential amplifier bias signal generation circuit in a broad sense). Note that the configuration of the disconnection detection circuit 52-2 is not limited thereto. For example, the disconnection detection circuit 52-2 may not include the control circuit 100.

The control circuit 100 may have the same configuration as in the first embodiment. The control circuit 100 supplies the control signal XENH to the first and second comparators CMP1 and CMP2 and the bias circuit 112 based on the enable signal EN.

The bias circuit 112 generates the bias signals BP and BN (second differential amplifier bias signal in a broad sense) based on the control signal XENH from the control circuit 100, and outputs the bias signals BP and BN to the first and second comparators CMP1 and CMP2. In more detail, when the control signal XENH is set to active, the bias circuit 112 sets the bias signal BP from a high level to a low level, and sets the bias signal BN from a low level to a high level. When the control signal XENH is set to inactive, the bias circuit 112 causes the bias signal BP to remain at a high level, and causes the bias signal BN to remain at a low level.

Figure 11:
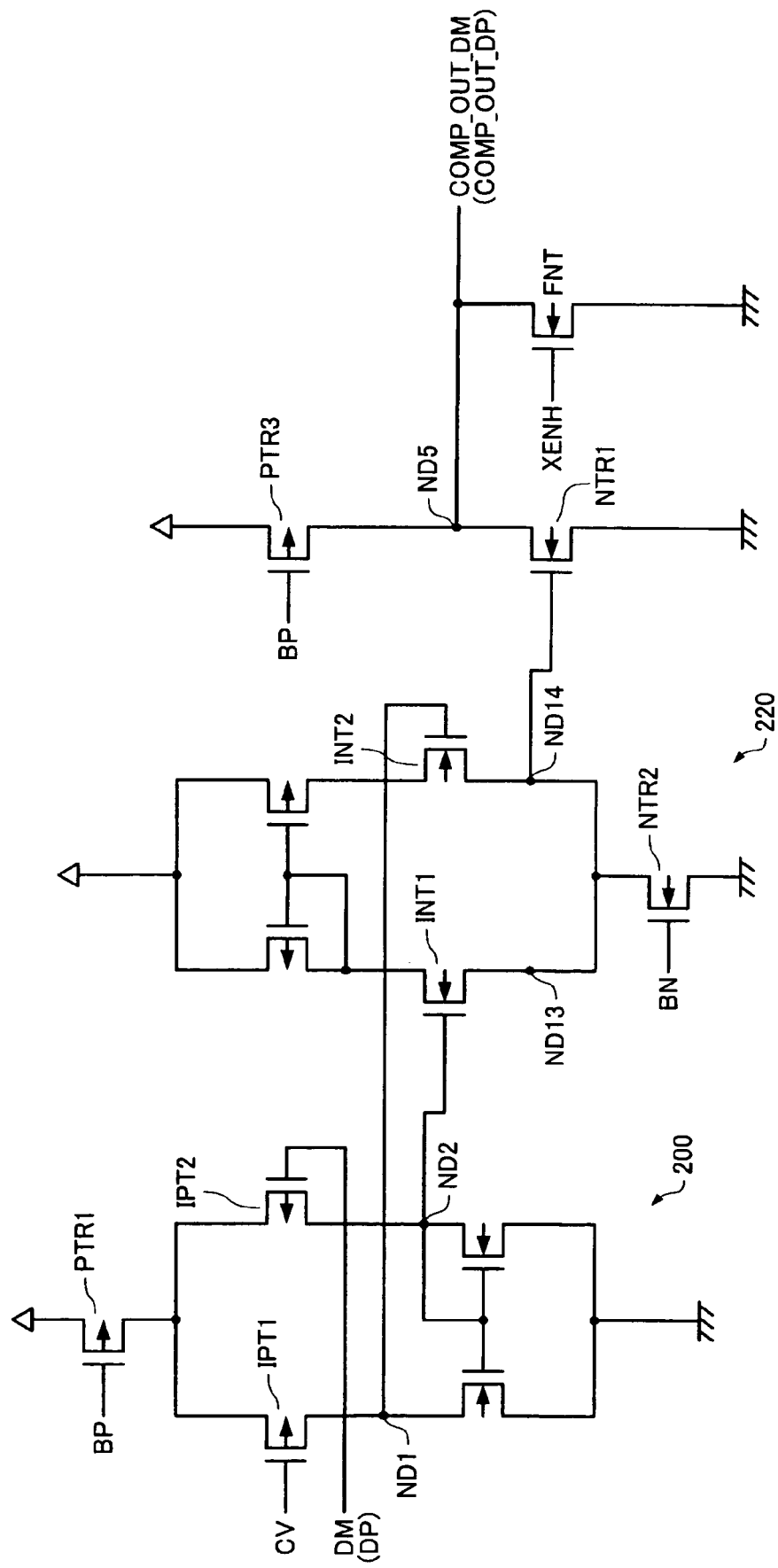
FIG. 11 is a view showing a circuit configuration of a comparator according to the second embodiment.

The current sources of the first and second comparators CMP1 and CMP2 are adjusted based on the signal level of the bias signals BP and BN. In more detail, as shown in FIG. 11, the current sources of the first differential amplifier 200 of the comparators CMP1 and CMP2 are turned ON when the bias signal BP is set at a low level, and are turned OFF when the bias signal BP is set at a high level. Likewise, the current sources of the second differential amplifiers 210 of the comparators CMP1 and CMP2 are turned ON when the bias signal BN is set at a high level, and are turned OFF when the bias signal BN is set at a low level.

The disconnection detection circuit 52-2 according to this embodiment differs from the disconnection detection circuit 52-1 according to the first embodiment as to the bias circuit 112 and the configurations of the comparators CMP1 and CMP2. The rest of this embodiment is the same as the first embodiment.

(Comparator)
FIG. 11 shows a configuration example of the first comparator CMP1 of the disconnection detection circuit 52-2 according to the second embodiment. Note that the second comparator CMP2 has the same circuit configuration as the first comparator CMP1. The comparator CMP1 shown in FIG. 11 includes the first differential amplifier 200 and a second differential amplifier 210. The difference between the comparator CMP1 according to the first embodiment and the comparator CMP1 according to the second embodiment is that the second differential amplifiers 210 and 220 are interchanged. The rest of the configuration is the same in the first and second embodiments. The second differential amplifier 220 includes a third input transistor INT1 and a fourth input transistor INT2. The third and fourth input transistors INT1 and INT2 are formed of n-type MOS transistors. The gate of the third input transistor INT1 is connected with the node ND2 of the first differential amplifier 200. The gate of the fourth input transistor INT2 is connected with the node ND1 of the first differential amplifier 200.

The second differential amplifier 220 includes an n-type transistor NTR2. The bias signal BN from the bias circuit 112 in FIG. 10 is input to the gate of the n-type transistor NTR2. Current supplied to the differential amplifier 220 is adjusted based on the voltage level of the bias signal BN.

The gate of the n-type transistor NTR1 is connected with a node ND14 of the second differential amplifier 220.

When the control circuit 100 receives the enable signal EN set to active, the control circuit 100 sets the control signal XENH to active, as described above. In this case, the control signal XENH is set at a low level, for example. This allows the bias signal BP set at a low level from a high level and the bias signal BN set at a high level from a low level to be supplied to the comparators CMP1 and CMP2 from the bias circuit 112, for example. This allows the transistors PTR1 and NTR2 as the current sources of the differential amplifiers 200 and 220 to be turned ON.

When the enable signal EN supplied to the control circuit 100 in FIG. 10 has been set to active, the bias signals BP and BN of the bias circuit 112 are set to active. This allows the current sources of the comparators CMP1 and CMP2 to be turned ON, whereby the differential amplifiers 200 and 220 of the comparators CMP1 and CMP2 operate. The potential of the node ND14 of the second differential amplifier 220 changes corresponding to the difference between the comparison voltage CV and the signal level of the differential signal DM (DP). The n-type transistor NTR1 is controlled corresponding to the potential of the node ND14, and the comparison result between the comparison voltage CV and the differential signal DM (DP) is output as the detection signal COMP_OUT_DM (COMP_OUT_DP).

The operation of the comparators CMP1 and CMP2 according to the second embodiment is described below using the waveform diagrams shown in FIGS. 12A to 12D and 13A to 13D. FIGS. 12A to 12D are waveform diagrams when the host and the device are connected, and FIGS. 13A to 13D are waveform diagrams when the host and the device are disconnected. In FIGS. 12A to 12D and FIGS. 13A to 13D, the comparison voltage CV is set at 600 mV (see FIG. 8A), for example.

Figure 12A:
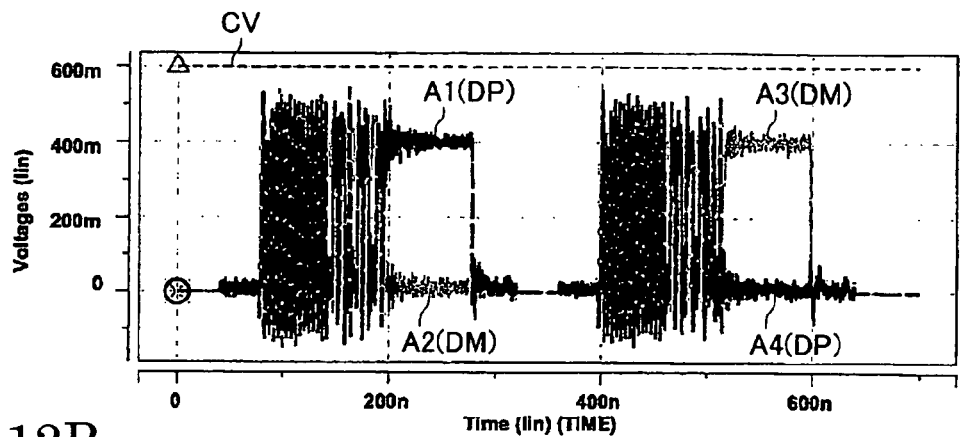
FIGS. 12A to 12D are waveform diagrams illustrative of the operation of the disconnection detection circuit according to the second embodiment in a connection state.
Figure 12B:
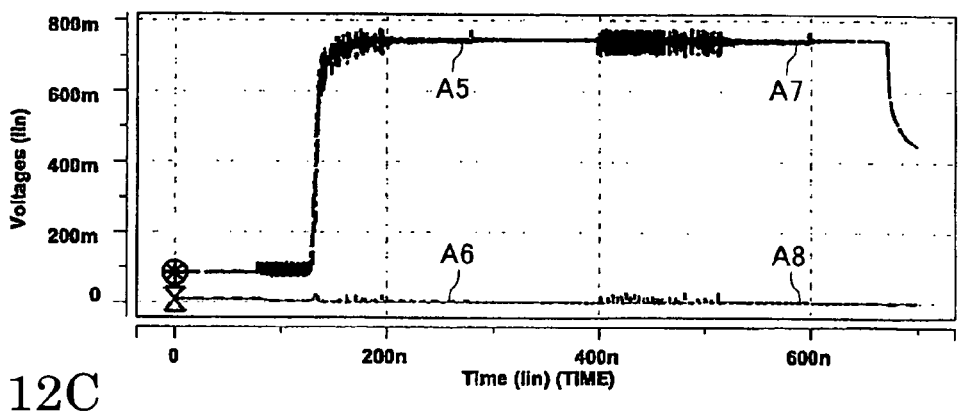
Figure 12C:
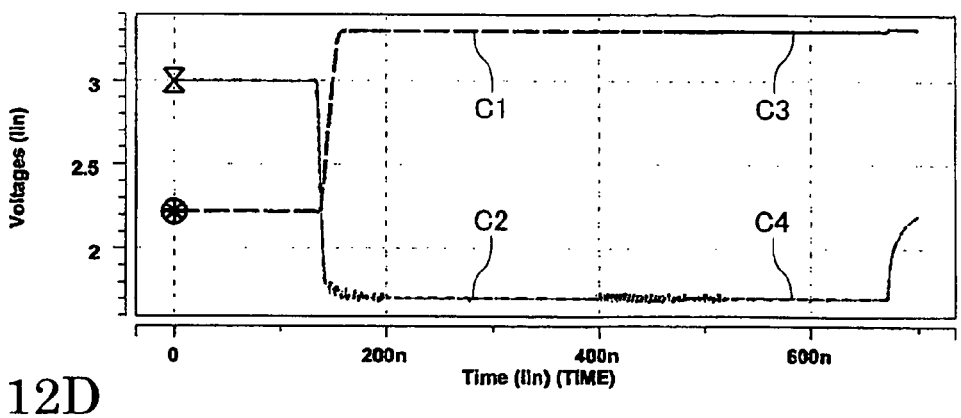

In FIG. 12A, A1 indicates the EOP of the differential signal DP, and A2 indicates the EOP of the differential signal DM, for example. In FIG. 12A, A3 indicates the EOP of the differential signal DM, and A4 indicates the EOP of the differential signal DP, for example. The waveforms in FIGS. 12A and 12B are the same as the waveforms in FIGS. 8A and 8B. Since the first differential amplifier 200 operates similarly in the first and second embodiments, the waveforms of the nodes ND1 and ND2 are approximately the same when the input differential signals DP and DM are the same.

The operation of the disconnection detection circuit 52-2 when the host and the device are connected is described below. When the host and the device are connected, the voltage levels of the differential signals DP and DM when the SOF packet has been transmitted are lower than the voltage level of the comparison voltage CV in a period corresponding to the EOP, as indicated by A1 and A3 in FIG. 12A. In this case, the disconnection detection circuit 52-2 must output a signal indicating that the host and the device are connected.

In this case, the voltage levels of the nodes ND1 of the comparators CMP1 and CMP2 in FIG. 11 are set at a low level, as indicated by A6 and A8 in FIG. 12B, and the voltage levels of the nodes ND2 are set at a high level, as indicated by A5 and A7. FIG. 12B is a waveform diagram showing the voltage levels of the nodes ND1 and ND2 in FIG. 11.

Accordingly, the high-level voltage is input to the gate of the input transistor INT1 of the differential amplifier 220 in FIG. 11, and the low-level voltage is input to the gate of the input transistor INT2. Therefore, the voltage level of the node ND4 is set at a high level, as indicated by C1 and C3 in FIG. 12C. The voltage level of the node ND3 is set at a low level, as indicated by C2 and C4 in FIG. 12C.

Since the voltage level of the node ND4 is set at a high level, the n-type transistor NTR1 is turned ON, whereby the voltage level of the node ND5 changes to the ground level. Therefore, the voltage levels of the detection signals COMP_OUT_DM and COMP_OUT_DP of the comparators CMP1 and CMP2 are set at a low level, as indicated by C5 in FIG. 12D. Specifically, the disconnection detection circuit 52-2 in FIG. 10 can output the detection signal indicating that the host and the device are not disconnected without erroneously detecting disconnection when the host and the device are connected.

Figure 12D:
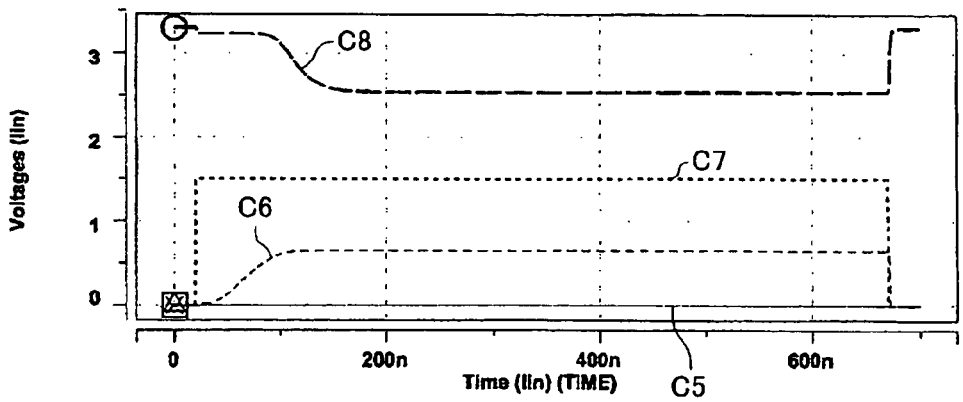

C7 in FIG. 12D indicates the voltage level of the enable signal EN in FIG. 10. The enable signal EN is set at a high level (active) when detecting disconnection, and the bias signal BP is set at a low level from a high level, as indicated by C8 in FIG. 12D. The bias signal BN is set at a high level from a low level, as indicated by C6. This allows current to flow between the source and the drain of each of the transistors PTR1, PTR3, and NTR2 in FIG. 11.

The operation of the disconnection detection circuit 52-2 when the host and the device are disconnected is described below. When the host and the device are disconnected, the voltage levels of the differential signals DP and DM when the SOF packet has been transmitted are higher than the voltage level of the comparison voltage CV in a period corresponding to the EOP, as indicated by D1 and D3 in FIG. 13A. In this case, the disconnection detection circuit 52-2 must output a signal indicating that the host and the device are disconnected.

Figure 13A:
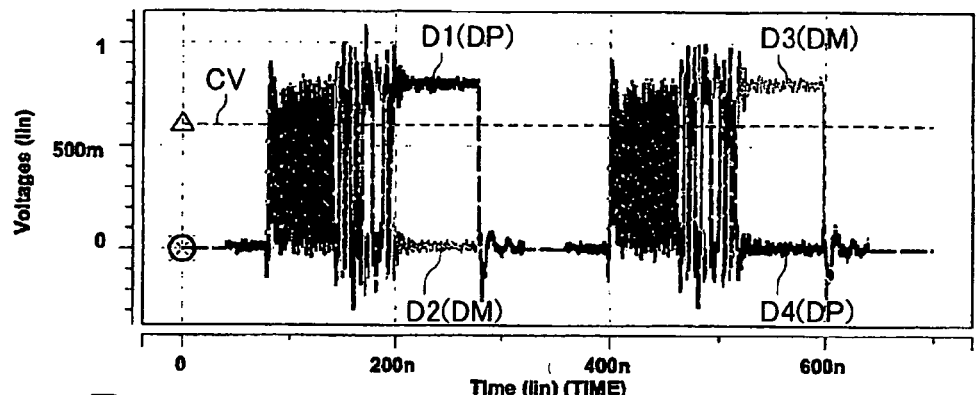
FIGS. 13A to 13D are waveform diagrams illustrative of the operation of the disconnection detection circuit according to the second embodiment in a disconnection state.

For example, when the differential signals DP and DM of the EOP of the SOF packet are in a state as indicated by D1 and D2 in FIG. 13A, the comparison voltage CV is input to the gate of the input transistor IPT1 of the comparator CMP1 in FIG. 11, and the differential signal DP of which the voltage level is higher than that of the comparison voltage CV, as shown in FIG. 13A, is input to the gate of the input transistor IPT2 of the comparator CMP1.

Figure 13B:
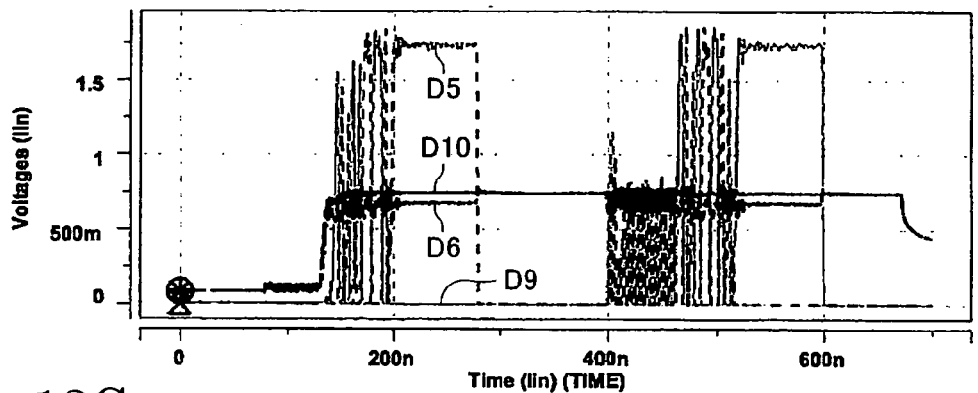
Figure 13C:
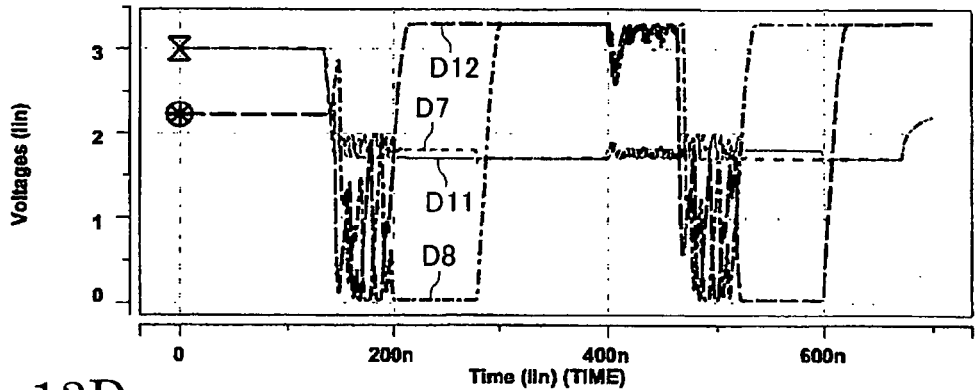

This allows the voltage level of the node ND1 of the comparator CMP1 in FIG. 11 to be set at a high level, as indicated by D5 in FIG. 13B, and allows the voltage level of the node ND2 of the comparator CMP1 to be set at a low level, as indicated by D6. Therefore, the low-level voltage is input to the gate of the input transistor INT1 of the differential amplifier 220 of the comparator CMP1, and the high-level voltage is input to the gate of the input transistor INT2. Specifically, the voltage level of the node ND3 of the differential amplifier 220 becomes higher than the voltage level of the node ND4 (D8), as indicated by D7 in FIG. 13C, and the voltage level of the node ND4 is set at a low level, as indicated by D8 in FIG. 13C.

Therefore, since the low-level voltage is input to the gate of the n-type transistor NTR1 of the comparator CMP1 in FIG. 11, the node ND5 in FIG. 11 is set at a voltage level adjusted by the p-type transistor PTR3, whereby the detection signal COMP_OUT_DP of the comparator CMP1 is set at a high level.

In the comparator CMP2 to which the differential signal DM is input, the comparison voltage CV is input to the gate of the input transistor IPT1 of the comparator CMP2 in FIG. 11, and the differential signal DM of which the voltage level is lower than that of the comparison voltage CV, as indicated by D2 in FIG. 13A, is input to the gate of the input transistor IPT2 of the comparator CMP2.

This allows the voltage level of the node ND1 of the comparator CMP2 in FIG. 11 to be set at a low level, as indicated by D9 in FIG. 13B, and allows the voltage level of the node ND2 of the comparator CMP1 to be set at a high level, as indicated by D10. Therefore, the high-level voltage is input to the gate of the input transistor INT1 of the differential amplifier 220 of the comparator CMP2, and the low-level voltage is input to the gate of the input transistor INT2. Specifically, the voltage level of the node ND3 of the differential amplifier 220 becomes lower than the voltage level of the node ND4 (D12), as indicated by D11 in FIG. 13C, and the voltage level of the node ND4 is set at a high level, as indicated by D12 in FIG. 13C.

This allows the high-level voltage to be input to the gate of the n-type transistor NTR1 of the comparator CMP2 in FIG. 11, whereby the voltage level of the node ND5 in FIG. 11 changes to the ground level in the same manner as in the case where the host and the device are connected as described above.

Therefore, the voltage level of the detection signal COMP_OUT_DP of the comparator CMP1 is set at a high level, and the detection signal COMP_OUT_DM of the comparator CMP2 is set at a low level. Specifically, the disconnection detection circuit 52-2 outputs a high-level signal indicating that the host and the device are disconnected, as indicated by D13 in FIG. 13D. The above is disconnection detection when the voltage level of the differential signal DP has exceeded the voltage level of the comparison voltage CV, as indicated by D1 in FIG. 13A. The disconnection detection circuit 52-2 can detect disconnection immediately after comparing the differential signal DP indicated by D1 in FIG. 13A with the comparison voltage CV, as indicated by D13 in FIG. 13D.

Figure 13D:
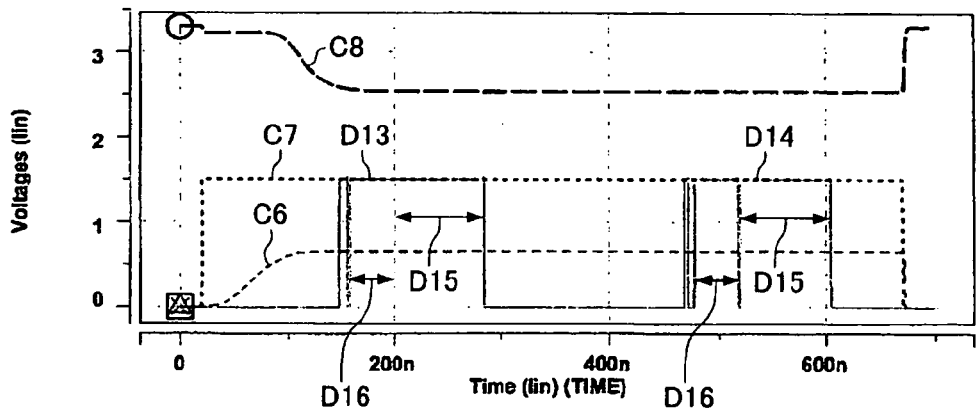

In FIG. 13D, C7 indicates the voltage level of the enable signal EN in FIG. 10 in the same manner as in FIG. 12D, C6 indicates the bias signal BN, and C7 indicates the bias signal BP.

When the voltage level of the differential signal DM of the EOP of the SOF packet is higher than the voltage level of the comparison voltage CV, and the voltage level of the differential signal DP is lower than the voltage level of the comparison voltage CV, as indicated by B3 and B4 in FIG. 13A, the comparison voltage CV is input to the gate of the input transistor IPT1 of the comparator CMP1 in FIG. 11, and the differential signal DM of which the voltage level is higher than that of the comparison voltage CV, as shown in FIG. 11A, is input to the gate of the input transistor IPT2 of the comparator CMP1.

In this case, the operation of the disconnection detection circuit 52-2 is almost the same as that when the voltage level of the differential signal DP is higher than the voltage level of the comparison voltage CV, in which only the waveforms indicating the voltage levels of the nodes ND1 to ND4 are interchanged between the comparators CMP1 and CMP2. Therefore, the disconnection detection circuit 52-2 outputs a high-level signal indicating that the host and the device are disconnected, as indicated by D14 in FIG. 13D. In this case, the disconnection detection circuit 52-2 can detect disconnection immediately after comparing the differential signal DP indicated by D1 in FIG. 13A with the comparison voltage CV, as indicated by D14 in FIG. 13D.

When comparing the disconnection detection circuit 52-1 according to the first embodiment with the disconnection detection circuit 52-2 according to the second embodiment, the period in which the detection signal is set at a high level when disconnection has been detected differs between the disconnection detection circuit 52-1 and the disconnection detection circuit 52-2. In the disconnection detection circuit 52-1, a signal indicating disconnection detection is set at a high level in the period corresponding to the EOP of the differential signals DP and DM, as indicated by B25 in FIG. 9D. In the disconnection detection circuit 52-2, a signal indicating disconnection detection is set at a high level in the period corresponding to the EOP of the differential signals DP and DM, as indicated by D15 in FIG. 13D, and the period other than the period corresponding to the EOP, as indicated by D16. Specifically, the comparators CMP1 and CMP2 of the disconnection detection circuit 52-2 can compare the voltage levels of the differential signals DP and DM in the period before the EOP with the comparison voltage CV. In the period before the EOP, the differential signals DP and DM oscillate with large amplitude, as shown in FIGS. 9A and 13A. Therefore, since the comparators CMP1 and CMP2 according to the first embodiment cannot follow the differential signals DP and DM which oscillate with large amplitude, disconnection is detected in a period corresponding to the EOP.

On the other hand, in the comparators CMP1 and CMP2 used in the disconnection detection circuit 52-2 according to the second embodiment, the third and fourth input transistors INT1 and INT2 of the second differential amplifier 220 are formed of the n-type transistors, as shown in FIG. 11. Since the n-type transistor can be switched at a speed higher than that of the p-type transistor, the comparators CMP1 and CMP2 in FIG. 11 can operate at a high speed in comparison with the comparators CMP1 and CMP2 in FIG. 7. Therefore, the comparators CMP1 and CMP2 in FIG. 11 can compare the comparison voltage CV with the voltage levels of the differential signals DP and DM which oscillate with large amplitude.

The comparators CMP1 and CMP2 in FIG. 11 may be considered as the comparators CMP1 and CMP2 in FIG. 7 in which the differential amplifier 210 is replaced with the differential amplifier 220. The power consumption of the differential amplifiers 210 and 220 can be almost made equal. Therefore, the second embodiment realizes a high-speed operation while maintaining low power consumption.

As described above, since the disconnection detection circuit 52-2 according to the second embodiment can detect disconnection even in a period before the EOP, the disconnection detection circuit 52-2 can quickly detect disconnection in comparison with the first embodiment when the host and the device have been disconnected.

4. Modification

The host and the device may be connected through a cable with a specific length, for example. In this case, the host-side receptacle is referred to as a receptacle A, and the device-side receptacle is referred to as a receptacle B. When the cable has been removed from the receptacle B of the device, the host and the device are disconnected. In this case, reflection of an SOF packet occurs on the end of the cable on the side of the receptacle B, and reflected waves are observed on the end of the cable on the side of the receptacle A. When the cable is removed from the receptacle A of the host, reflected waves are observed to only a small extent.

Figure 14A:
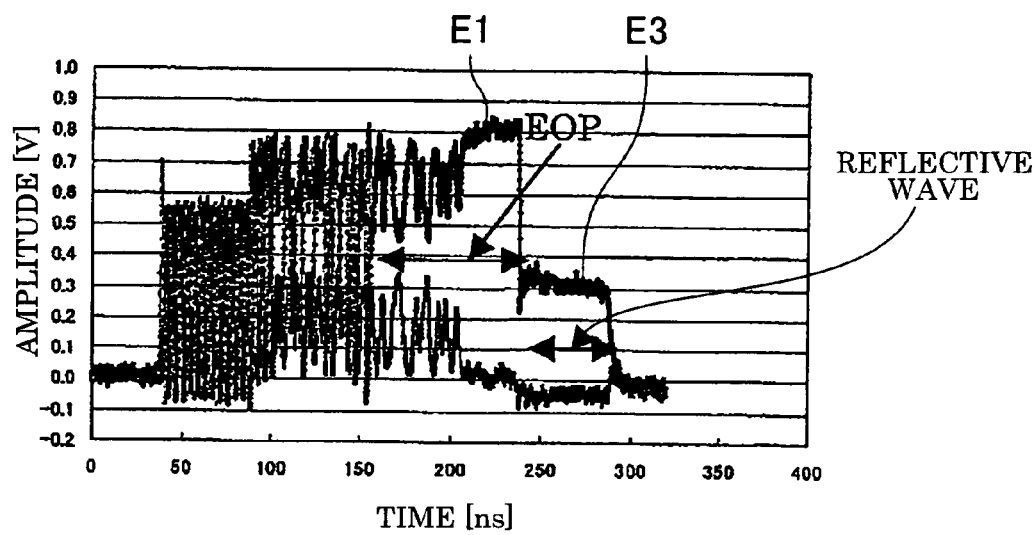
FIGS. 14A and 14B are waveform diagrams showing effects of reflected waves on an SOF packet.
Figure 14B:
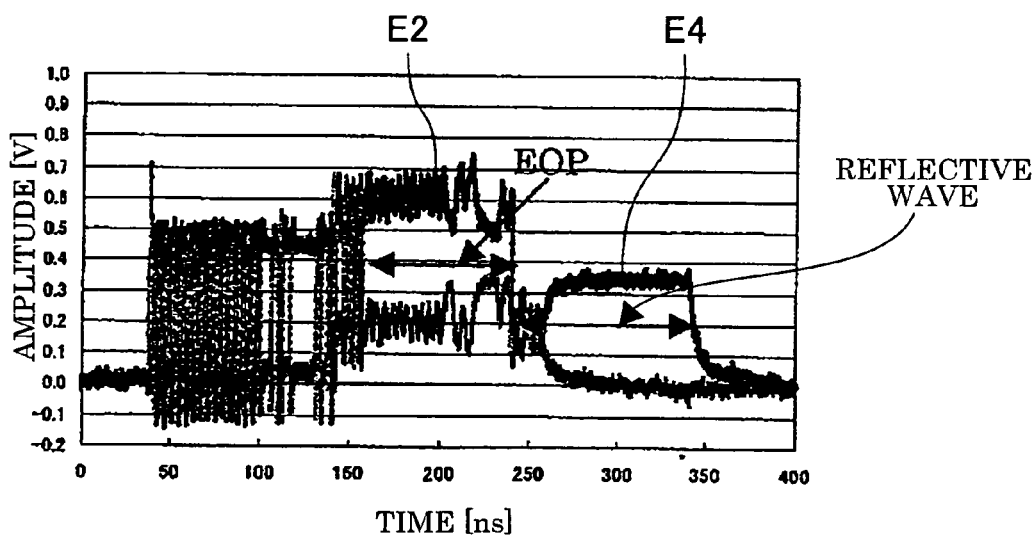

The effects of the reflected waves increase as the length of the cable increases. FIGS. 14A and 14B are waveform diagrams of an SOF packet observed on the side of the receptacle A when removing a cable with a length of 5 m or 10 m from the receptacle B, respectively, for example.

As indicated by E1 in FIG. 14A and E2 in FIG. 14B, the differential signals DP and DM are affected by reflected waves, whereby the waveforms of the EOP are disturbed. As a result, a situation may occur in which the host erroneously recognizes that the host and the device are connected even though the host and the device are disconnected.

In FIG. 14A, a period in which the voltage level of the differential signal DP or DM is higher than the voltage level of the comparison voltage is considerably reduced in the period of the EOP due to the effects of reflection, as indicated by E1. In this case, the disconnection detection circuits 52-1 and 52-2 may not accurately detect disconnection.

In FIG. 14B, the differential signals DP and DM in the period of the EOP are considerably disturbed due to the effects of reflected waves, whereby the disconnection detection circuits 52-1 and 52-2 cannot detect disconnection.

FIG. 15 shows a configuration example of a disconnection detection circuit 52-3 as a modification according to the first and second embodiments. In the disconnection detection circuit 52-3, first and second reflected wave comparators RCMP1 and RCMP2 and a latch circuit 120 are added to the configuration of the disconnection detection circuit 52-1 or 52-2. The specific configuration of the first and second reflected wave comparators RCMP1 and RCMP2 is the same as the configuration of the comparators CMP1 and CMP2 shown in FIG. 7 or 11. The first and second reflected wave comparators RCMP1 and RCMP2 compare the voltage level of the reflected waves indicated by E3 in FIG. 14A or E4 in FIG. 14B with a reflected wave comparison voltage RCV.

The comparison result between the voltage level of the reflected waves and the reflected wave comparison voltage RCV is supplied to the latch circuit 120. The latch circuit 120 latches the comparison result based on a reflected wave detection signal STB. In more detail, the latch circuit 120 latches the comparison result when the reflected wave detection signal STB has been set to active, for example.

The reflected wave detection signal STB is set by the higher-level circuit block, and is set to active at a specific timing after the SOF packet has been transmitted, for example. This allows the latch circuit 120 to latch the comparison result between the voltage level of the reflected waves and the reflected wave comparison voltage RCV when reflected waves have occurred. Since the higher-level circuit block can also direct transmission of the SOF packet, the host controller can determine the transmission timing of the SOF packet. The number of bits of the SOF packet is defined by the USB 2.0 standard. Therefore, the reflected wave detection signal STB can be set to active at a specific timing after the EOP of the SOF packet.

The operation of the disconnection detection circuit 52-3 is described below with reference to FIGS. 16A to 16C and FIGS. 17A to 17C.

Figure 16A:
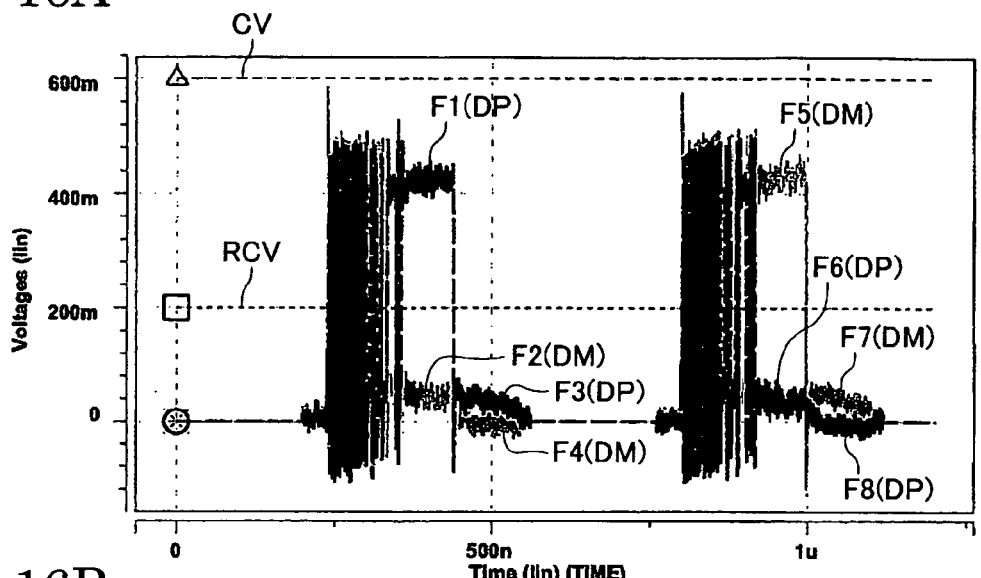
FIGS. 16A to 16C are waveform diagrams illustrative of the operation of a disconnection detection circuit according to the modification in a connection state.
Figure 16B:
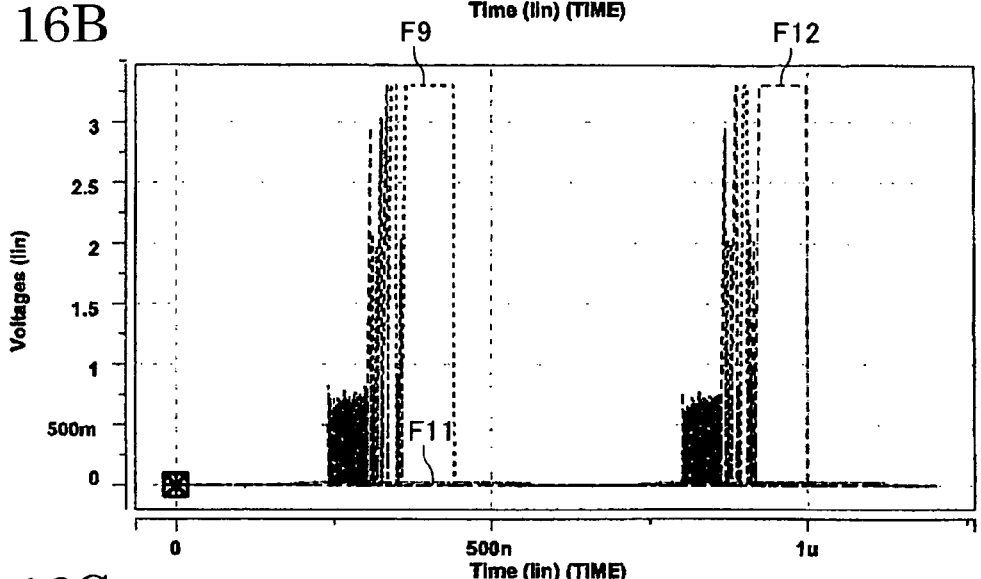
Figure 16C:
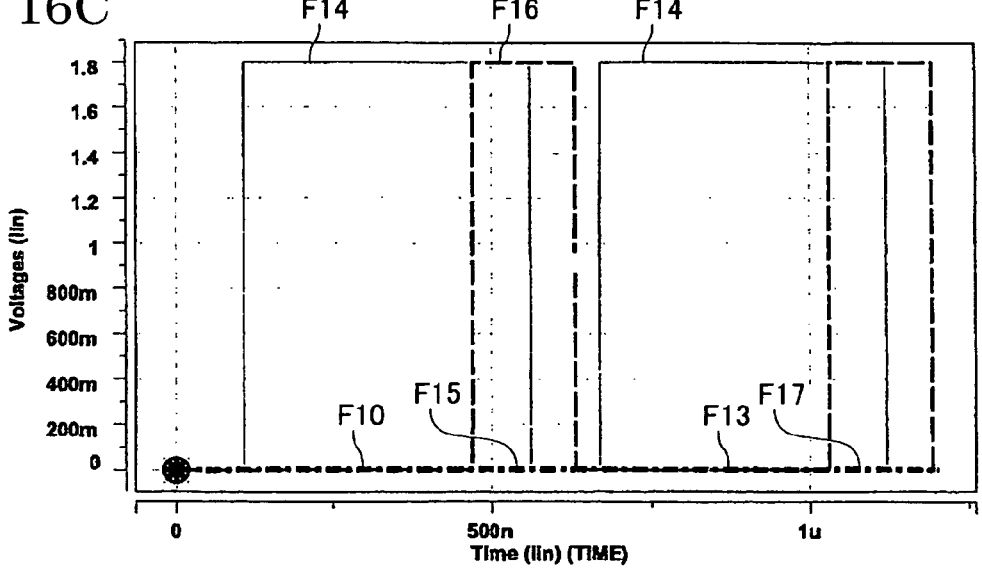
Figure 17A:
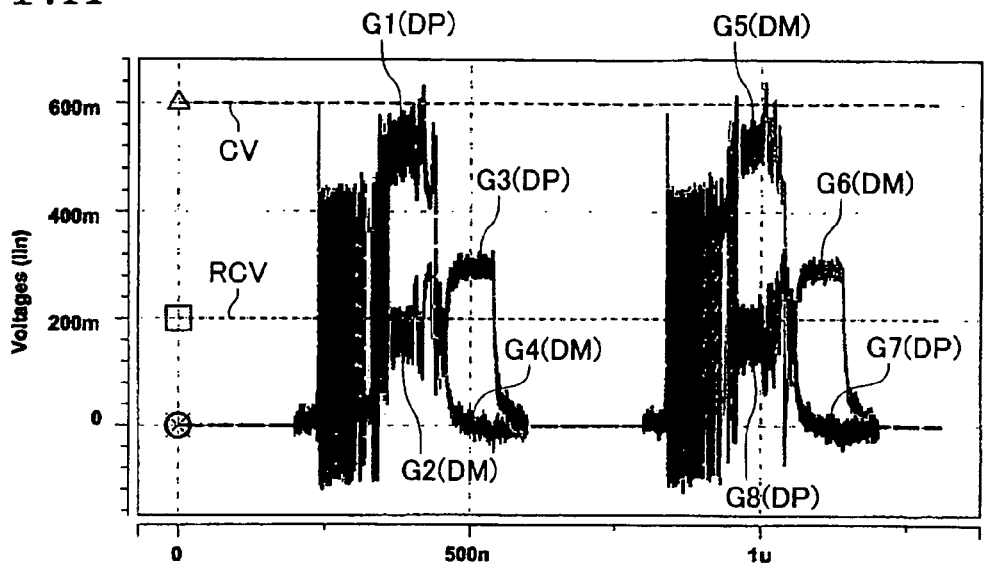
FIGS. 17A to 17C are waveform diagrams illustrative of the operation of the disconnection detection circuit according to the modification in a disconnection state.
Figure 17B:
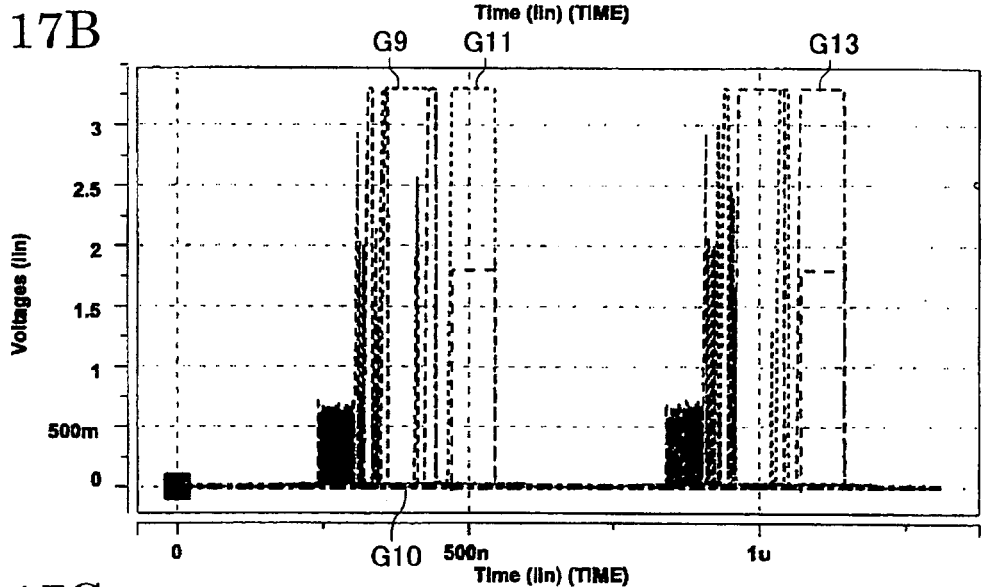
Figure 17C:
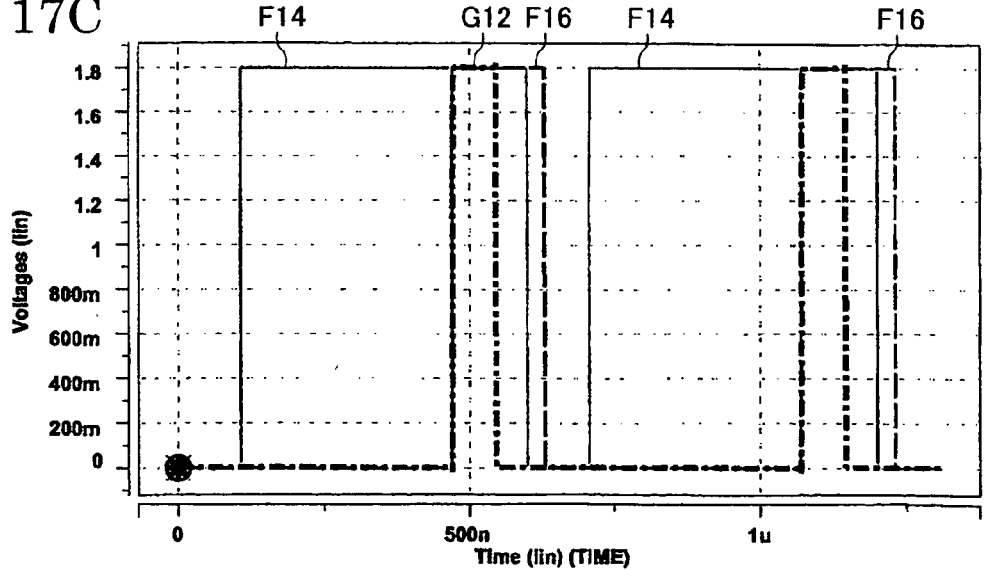

FIGS. 16A to 16C are waveform diagrams when the host and the device are connected, and FIGS. 17A to 17C are waveform diagrams when the host and the device are disconnected. In FIGS. 16A to 16C and FIGS. 17A to 17C, the comparison voltage CV is set at 600 mV (see FIG. 16A), and the reflected wave comparison voltage RCV is set at 200 mV, for example.

In FIG. 16A, F1 and F6 indicate the EOP of the differential signal DP, and F2 and F5 indicate the EOP of the differential signal DM, for example. In FIG. 16A, F3 and F8 indicate the reflected waves of the differential signal DP, and F4 and F7 indicate the reflected waves of the differential signal DM, for example.

The operation of the disconnection detection circuit 52-3 when the host and the device are not disconnected is described below. When the host and the device are connected, the voltage levels of the differential signals DP and DM when the SOF packet has been transmitted are lower than the voltage level of the comparison voltage CV in a period corresponding to the EOP, as indicated by F1 and F2 in FIG. 16A. In this case, the disconnection detection circuit 52 must output a signal indicating that the host and the device are connected.

In this case, the voltage level of the differential signal DP is higher than that of the reflected wave comparison voltage RCV, as indicated by F1 in FIG. 16A. Therefore, a detection signal OUTDP2 of the first reflected wave comparator RCMP1 in FIG. 15 is set at a high level, as indicated by F9 in FIG. 16B.

On the other hand, the reflected wave detection signal STB is set to active at a specific timing after the EOP of the SOF packet, as indicated by F16 in FIG. 16C. Therefore, since the reflected wave detection signal STB is set to inactive (e.g. low level) at the timing indicated by F10 in FIG. 16C, the high-level detection signal OUTDP2 indicated by F9 in FIG. 16B is not latched by the latch circuit 120.

Since the voltage level of the differential signal DM is lower than the reflected wave comparison voltage RCV, as indicated by F2 in FIG. 16A, a detection signal OUTDM2 of the second reflected wave comparator RCMP2 in FIG. 15 is set at a low level, as indicated by F11 in FIG. 16B.

Since the voltage levels of the differential signals DP and DM are lower than the comparison voltage CV, as indicated by F1 and F2 in FIG. 16A, the detection signals OUTDP1 and OUTDM1 of the comparators CMP1 and CMP2 in FIG. 15 are set at a low level, as indicated by F11 in FIG. 16B.

The disconnection detection circuit 52-3 thus outputs a low-level signal indicating that the host and the device are connected, as indicated by F15 in FIG. 16C.

F14 in FIG. 16C indicates the enable signal EN. When the voltage level of the differential signal DM in the period of the EOP is higher than that of the reflected wave comparison voltage RCV, as indicated by F5 in FIG. 16A, the detection signal OUTDM2 of the second reflected wave comparator RCMP2 in FIG. 15 is set at a high level, as indicated by F12 in FIG. 16B. In this case, since the reflected wave detection signal STB is set to inactive (e.g. low level) at the timing indicated by F13 in FIG. 16C, the detection signal OUTDM2 is not latched by the latch circuit 120 in the same manner as described above. In this case, since the detection signal of the disconnection detection circuit 52-3 is also set at a low level, as indicated by F17 in FIG. 16C, the disconnection detection circuit 52-3 can accurately detect that the host and the device are connected.

The operation of the disconnection detection circuit 52-3 when the host and the device are disconnected is described below. When the host and the device are disconnected, the disconnection detection circuit 52-3 must output a signal indicating that the host and the device are disconnected. In this case, when the voltage levels of the differential signal DP and DM do not exceed the comparison voltage CV due to the effects of the reflected waves, as indicated by G1 and G5 in FIG. 17A, the disconnection detection circuit 52-3 may compare the voltage level of the reflected waves with the reflected wave comparison voltage RCV, as indicated by G3 and G6.

Since the voltage level of the differential signal DP is higher than the voltage level of the reflected wave comparison voltage RCV, as indicated by G1 in FIG. 17A, the detection signal OUTDP2 of the reflected wave comparator RCMP1 is set at a high level, as indicated by G9 in FIG. 17B. Since the latch circuit 120 performs the latch operation based on the reflected wave detection signal STB, as described above, the high-level detection signal OUTDP2 indicated by G9 is not latched by the latch circuit 120.

Since the voltage levels of the differential signals DP and DM are lower than the comparison voltage CV, as indicated by G1 and G2 in FIG. 17A, the detection signals OUTDP1 and OUTDM1 of the comparators CMP1 and CMP2 in FIG. 15 are set at a low level, as indicated by G10 in FIG. 17B.

Since the voltage level of the differential signal DP is higher than the reflected wave comparison voltage RCV, as indicated by G3 in FIG. 17A, the detection signal OUTDP2 of the reflected wave comparator RCMP1 is set at a high level, as indicated by G11 in FIG. 17B. In this case, since the reflected wave detection signal STB is set to active, as indicated by F16 in FIG. 17C, the high-level detection signal OUTDP2 indicated by G11 in FIG. 17B is not latched by the latch circuit 120. Therefore, the disconnection detection circuit 52-3 outputs the high-level detection signal, as indicated by G12 in FIG. 17C. Specifically, the disconnection detection circuit 52-3 can detect that the host and the device are disconnected, even if the SOF packet is affected by the reflected waves.

When the voltage level of the differential signal DM exceeds the reflected wave comparison voltage RCV, as indicated by G6 in FIG. 17A, the detection signal OUTDM2 of the second reflected wave comparator RCMP2 is set at a high level, as indicated by G13 in FIG. 17B, in the same manner as described above. This allows the disconnection detection circuit 52-3 to accurately detect that the host and the device are disconnected.

As described above, since the disconnection detection circuit 52-3 can compare the voltage level of the reflected waves with the reflected waves, even if the voltage levels of the differential signals DP and DM in the period of the EOP are affected by the reflected waves, the disconnection detection circuit 52-3 can accurately detect disconnection.

Although only some embodiments of the invention have been described in detail above, those skilled in the art will readily appreciate that many modifications are possible in the embodiments without departing from the novel teachings and advantages of this invention. Accordingly, such modifications are intended to be included within the scope of the invention. Any term cited with a different term having a broader meaning or the same meaning at least once in the specification and the drawings can be replaced by the different term in any place in the specification and the drawings.

Although only some embodiments of the invention are described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A host controller that transfers data through a bus using a differential signal pair and transmits to device packets defined by a given standard at given intervals defined by the given standard, the differential signal pair being made up by a first differential signal and a second differential signal, the host controller comprising:

a first comparator that is configured to receive the first differential signal, the first comparator being configured to compare a first voltage level of the first differential signal corresponding to a given packet in the device packets with a comparison voltage, and the first comparator being configured to detect that a host and a device have been disconnected when the first voltage level of the first differential signal corresponding to the given packet is higher than the comparison voltage; and a second comparator that is configured to receive the second differential signal, the second comparator being configured to compare a second voltage level of the second differential signal corresponding to the given packet in the device packets with the comparison voltage, and the second comparator being configured to detect that the host and the device have been disconnected when the second voltage level of the second differential signal corresponding to the given packet is higher than the comparison voltage, each of the first comparator and the second comparator including a first differential amplifier and a second differential amplifier;

the first differential amplifier including a first input transistor and a second input transistor, the first input transistor and the second input transistor being connected in parallel between a first power supply and a second power supply of which power supply voltage being lower than that of the first power supply;

the comparison voltage being input to a gate of the first input transistor;

one of the first differential signal and the second differential signal being input to a gate of the second input transistor of the first differential amplifier of the first comparator;

another of the first differential signal and second differential signal being input to a gate of the second input transistor of the first differential amplifier of the second comparator;

the second differential amplifier including a third input transistor and a fourth input transistor the third input transistor and the forth input transistor being connected in parallel between the first power supply and the second power supply;

a gate of the fourth input transistor being connected with a first output node connected between the first input transistor and the second power supply; and a gate of the third input transistor being connected with a second output node connected between the second input transistor and the second power supply.

2. The host controller as defined in claim 1, wherein each of an output stage of the first comparator and an output stage of the second comparator includes an output fixing switch which fixes an output of the first comparator and an output of the second comparator at a ground level, respectively; and wherein the output fixing switch is configured to be turned OFF when an enable signal is set to active, and is turned ON when the enable signal is set to inactive.

3. The host controller as defined in 1, comprising:

a bias signal generation circuit which generates a bias signal which adjusts current sources of the first comparator and the second comparator;

wherein the bias signal generation circuit generates the bias signal when the enable signal is set to active, and does not generate the bias signal when the enable signal is set to inactive.

4. The host controller as defined claim 1, wherein each of the first input transistor, the second input transistor, the third input transistor, and the fourth input transistor is formed of p-type transistors.

5. The host controller as defined in claim 4, wherein detection results of the first comparator and detection results of the second comparator are output based on a voltage level of a third output node between the fourth input transistor and the second power supply.

6. The host controller as defined in claim 1, wherein detection results of the first comparator and detection results of the second comparator are output based on a voltage level of a third output node between the fourth input transistor and the second power supply.

7. The host controller as defined in claim 1, wherein each of the first input transistor and the second input transistor is formed of p-type transistors, and wherein each of the third input transistor and the fourth input transistor is formed of n-type transistors.

8. The host controller as defined in claim 7, wherein each of the first comparator and the second comparator includes a second differential amplifier bias signal generation circuit which is configured to generate a second differential amplifier bias signal for adjusting a current source of the second differential amplifier; and wherein the second differential amplifier bias signal generation circuit is configured to generate the second differential amplifier bias signal when the enable signal is set to active, and not to generate the second differential amplifier bias signal when the enable signal is set to inactive.

9. The host controller as defined in claim 8, wherein detection results of the first comparator and detection results of the second comparator are output based on a voltage level of a third output node between the fourth input transistor and the second power supply.

10. The host controller as defined in claim 7, wherein detection results of the first comparator and detection result of the second comparator are output based on a voltage level of a third output node between the fourth input transistor and the second power supply.

11. The host controller as defined in claim 1, wherein the given standard is the Universal Serial Bus (USB) 2.0 standard.

12. The host controller as defined in claim 11,
wherein the frame packet is a Start-of-Frame (SOF) packet defined by the USB 2.0 standard.

13. The host controller as defined in claim 12,
wherein the given range corresponds to an End-of-Packet (EOP) defined by the USB 2.0 standard.

14. The host controller as defined in claim 1,
an output stage of the first comparator including an output fixing switch which fixes an output of the first comparator at a ground level, an output stage of the second comparator including a second output fixing switch which fixes an output of the second comparator at a ground level, and the first output fixing switch and the second output fixing switch being turned OFF when the enable signal is set to active, and is turned ON when the enable signal is set to inactive.

* * * * *